(12) United States Patent
Suzuki et al.

(10) Patent No.: US 7,187,360 B2
(45) Date of Patent: Mar. 6, 2007

(54) POINTING DEVICE AND ELECTRONIC APPARATUS PROVIDED WITH THE POINTING DEVICE

(75) Inventors: Daisuke Suzuki, Tokyo (JP); Masayuki Kushita, Tokyo (JP); Hiroyuki Kiuchi, Tokyo (JP); Ryuuji Matsuo, Saitama (JP); Katsuaki Fujihara, Tokyo (JP)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 10/716,668

(22) Filed: Nov. 20, 2003

(65) Prior Publication Data

US 2004/0108993 A1      Jun. 10, 2004

(30) Foreign Application Priority Data

Nov. 25, 2002   (JP)   .............................. 2002-341428

(51) Int. Cl.
   *G09G 5/08*   (2006.01)
(52) U.S. Cl. ...................... 345/160; 345/156; 345/159; 341/23
(58) Field of Classification Search ................ 345/156, 345/157, 158–161, 168; 341/22, 23
   See application file for complete search history.

(56) References Cited

U.S. PATENT DOCUMENTS

| | | | |
|---|---|---|---|
| 5,627,767 A | * | 5/1997 | Gabiniewicz et al. ......... 702/41 |
| 5,786,805 A | | 7/1998 | Barry |
| 6,326,948 B1 | * | 12/2001 | Kobachi et al. ............ 345/157 |
| 6,583,784 B1 | * | 6/2003 | Helmbrecht ................ 345/167 |

(Continued)

FOREIGN PATENT DOCUMENTS

EP       1 223 541      7/2002

(Continued)

*Primary Examiner*—Richard Hjerpe
*Assistant Examiner*—Kimnhung Nguyen
(74) *Attorney, Agent, or Firm*—Young & Thompson

(57) ABSTRACT

A pointing device capable of generating a fixed control signal regardless of operated directions and preventing the generation of a control signal owing to malfunctions, and an electronic apparatus capable of moving a controlled object on a display screen in any direction at a velocity corresponding to an operated amount of an operating section. An original point is defined as a point where a slid distance of a slide key is 0. The maximum slid distance and the minimum slid distance are defined as max_max and min_max, respectively, when moving the slide key until it reaches the rim of an opening section. When the slide key is located within a circular area whose center is the original point and whose radius is n/N of max_max (n and N are arbitrary positive integers, and n<N), a calculating section determines the strength of a control signal as 0. When the slide key is located within a toric area whose distance from the original point is larger than n/N of max_max and smaller than min_max, the calculating section determines the strength of a control signal according to the slid distance of the slide key. When the slide key is located within an area whose distance from the original point is larger than min_max, the calculating section determines the same strength of a control signal as the strength determined when the slid distance of the slide key is min_max.

80 Claims, 25 Drawing Sheets

U.S. PATENT DOCUMENTS

| | | | |
|---|---|---|---|
| 6,670,947 B2 * | 12/2003 | Smyth | 345/167 |
| 6,707,446 B2 * | 3/2004 | Nakamura et al. | 345/160 |
| 6,760,006 B2 * | 7/2004 | Arita et al. | 345/156 |
| 2002/0171626 A1 * | 11/2002 | Nojima et al. | 345/156 |
| 2003/0063068 A1 * | 4/2003 | Anton et al. | 345/158 |
| 2003/0071785 A1 * | 4/2003 | Arita et al. | 345/156 |
| 2003/0142071 A1 * | 7/2003 | Yu | 345/157 |

FOREIGN PATENT DOCUMENTS

| | | |
|---|---|---|
| GB | 2 347 484 | 9/2000 |
| JP | 9-251344 | 9/1997 |
| JP | 2001-159953 | 6/2001 |
| WO | WO 01/65329 | 9/2001 |

* cited by examiner

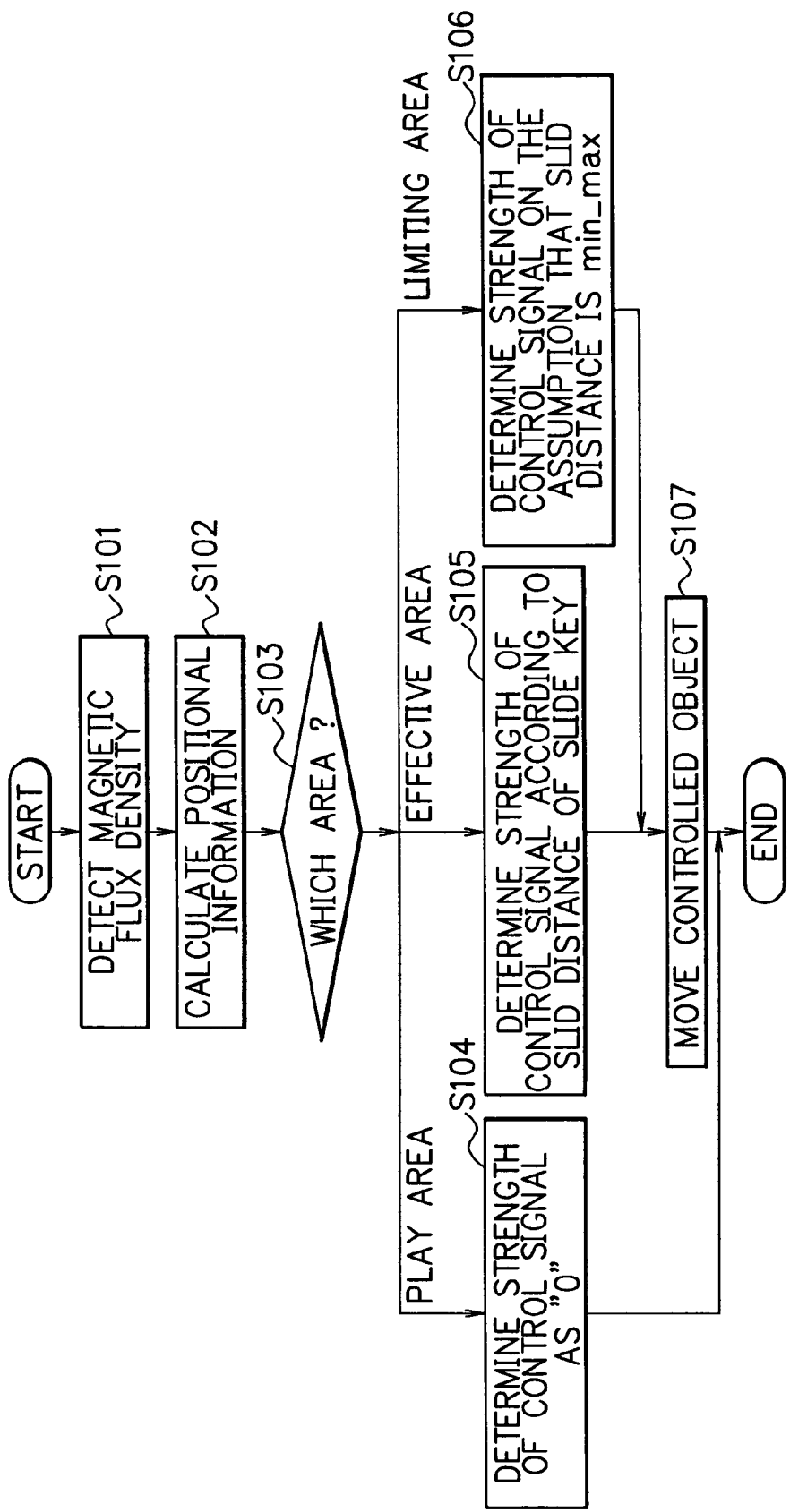

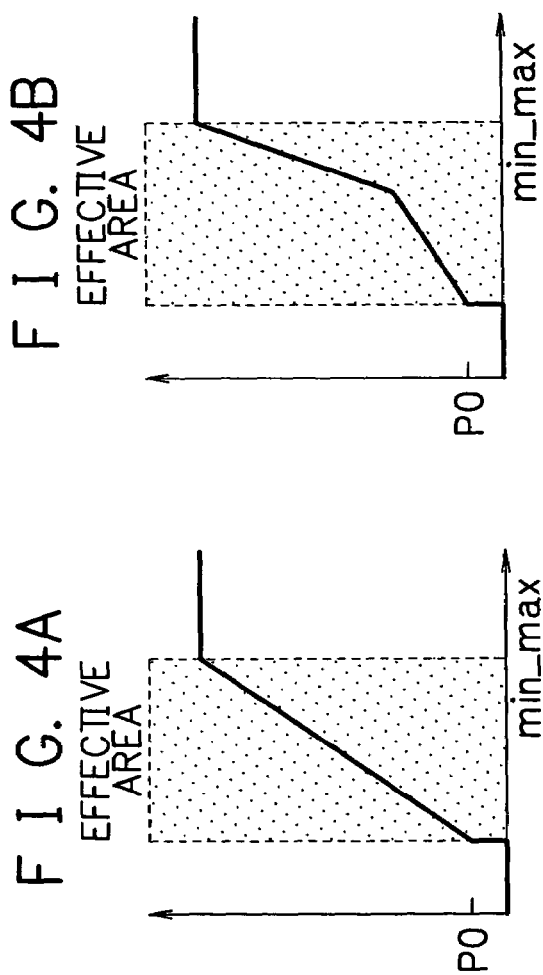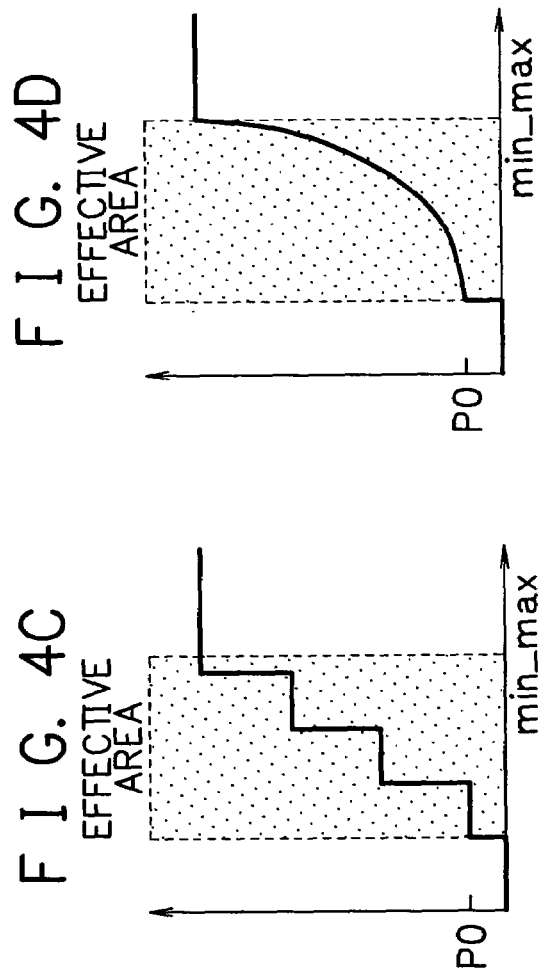

F I G. 7
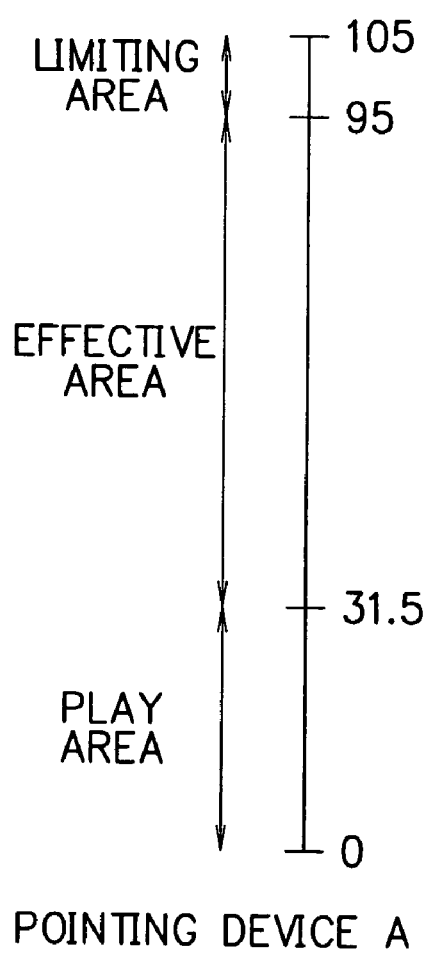
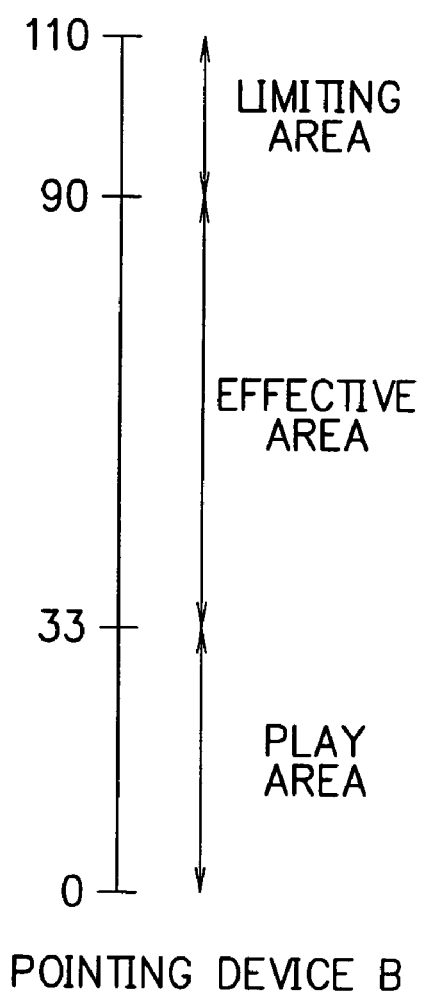

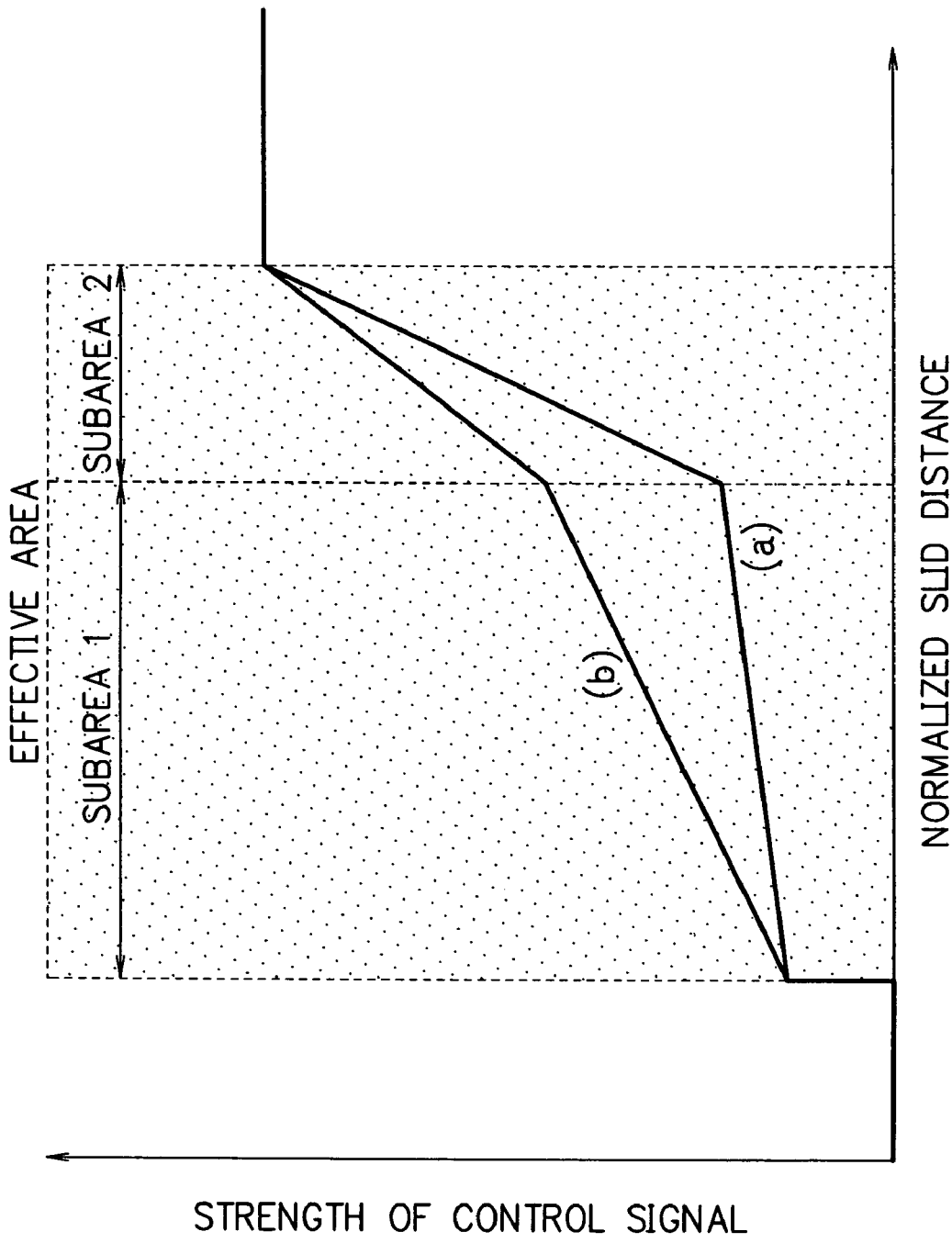
F I G. 12

POINTING DEVICE AND ELECTRONIC APPARATUS PROVIDED WITH THE POINTING DEVICE

BACKGROUND OF THE INVENTION

The present invention relates to an analog pointing device for generating a control signal in response to an operated direction and distance and an electronic apparatus provided with the pointing device, and in particular, to a pointing device and an electronic apparatus capable of generating a control signal with a fixed intensity and moving a controlled object on a display screen at a fixed velocity in response to a certain amount of operation regardless of an operated direction.

DESCRIPTION OF THE RELATED ART

A pointing device such as a mouse, a trackball and a joy stick has been used as an input device for generating a control signal in response to a control force in an arbitrary direction.

In the case of a mobile terminal, a pointing device has to be mounted in its body. A mobile terminal is often provided with a joy stick-type pointing device for generating a control signal in response to the inclined amount of its operating section. This kind of pointing device is disclosed in "Coordinate Inputting Device" in Japanese Patent Application Laid-Open No. 2001-159953 and in "Cursor Position Designating Device" in Japanese Patent Application Laid-Open No. HEI 9-251344.

When mounting a pointing device in a mobile terminal, it is not preferable to excessively protrude the pointing device from the body in terms of portability. Particularly in the case of a foldable mobile terminal, if the pointing device is protruded from the body, this would be an obstacle for the mobile terminal to be folded.

On the other hand, the joy stick-type pointing device for generating a control signal by inclining the operating section requires a sufficient length to achieve good operationality. Moreover, in the case of a pointing device that also generates a control signal in response to a push, a user may wrongly push down the operating section although intending to incline it. Accordingly, this kind of pointing device often introduces errors.

Moreover, when a pointing device has a configuration that the inclined amount of the operating section is detected with a magnet and a magnetoelectric device as disclosed in Japanese Patent Application Laid-Open No. 2001-159953, it is necessary to correct the result detected by the magnetoelectric device depending on the operated amount of the operating section to determine the inclined amount and direction. However, this correction is performed on the basis of approximate calculation in which a correction coefficient is obtained by raising an output voltage ratio to the number of the power. Accordingly, the determined inclined amount and direction of the operating section indicates an approximate value.

Therefore, it is preferable to apply to a mobile terminal a pointing device whose operating section is not inclined but slid to generate a control signal in response to the slid amount (distance).

The operating section of the slide-type pointing device is placed at the center of an opening section by being held with an elastic body from at least three directions. By this means, when removing the operation force from the operating section, the operating section returns to the center of the opening section by the elastic force of the elastic body.

However, when assembling the pointing device having such a structure, an error sometimes occurs and the initial position (original point) of the operating section may not be placed at the center of the opening section. Moreover, the force of returning to the original point, which acts on the operating section, varies and the operating section cannot always return to the original point accurately. Furthermore, even if the original point is exactly placed at the center of the opening section at the time of assembling, the operating section may not return to the original point but to another point as the balance of elastic force that acts on the operating section gets lost with gradual deterioration of the elastic body.

When a control signal is generated in response to the slid distance of the operating section despite the original point is not placed at the center of the opening section, variations occur in control signals according to the directions to which the operating section is slid. This leads to deteriorated operationality of the operating section.

In other words, when the original point is not positioned at the center of the opening section, the maximum slid distance differs in the respective directions. Thereby, the maximum value of the respective control signals differs according to the directions.

Moreover, when employing the slide-type pointing device, it is necessary to control the pointing device so that the malfunction does not occur when some unintentional forces act on the operating section despite adding no operation force. For this purpose, it is necessary to set an area where the pointing device does not generate a control signal when the slid distance of the operating section is within a predetermined amount.

However, when setting this area on the basis of the center of the opening section despite the original point is not positioned at the center of the opening section, a control signal may be generated without sliding the operating section from the original point.

This problem also occurs when employing a joy stick-type pointing device. When setting an area where a control signal is not generated around the central position of the joy stick as disclosed in Japanese Patent Application Laid-Open No. HEI 9-251344, the same malfunction may occur as described above.

SUMMARY OF THE INVENTION

It is therefore an object of the present invention to provide a pointing device capable of generating a fixed control signal regardless of an operated direction and preventing a control signal from being generated due to a malfunction in a state where an operating section is not slid even if a deviation exists between the original point of the operating section and the center of the opening section, and an electronic apparatus capable of moving a controlled object on a display screen in any direction at a velocity corresponding to an operated amount.

According to a first aspect of the present invention, for achieving the objects mentioned above, there is provided a pointing device for detecting a slid distance and a slid direction of an operation key located approximately at the center of an opening section to generate a control signal according to the detected slid distance and the slid direction, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates the control signal corresponding to the slid distance of the operation key by:

determining a strength of the control signal as zero in the case where the operation key is located within a circular area whose center is located at the original point and whose radius is n/N of the max_max (n and N are arbitrary positive integers, and n<N);

determining a strength of the control signal corresponding to the slid distance of the operation key on the basis of a predetermined rule of operation in the case where the operation key is located within a toric area whose distance from the original point is larger than n/N of the max_max and smaller than the min_max; or determining a strength of the control signal corresponding to a strength obtained when a slid distance of the operation key is the min_max in the case where the operation key is located within an area whose distance from the original point is larger than the min_max.

In the first aspect, it is preferable to comprise a plurality of rules of operations for transforming the slid distance of the operation key into the strength of the control signal.

Moreover, in the first aspect with any configuration, it is preferable that:

the toric area is divided into a plurality of subareas by setting at least one circular arc as a boundary whose center is the original point; and the respective subareas have different variations of the strength of the control signal to the slid distance of the operation key.

According to a second aspect of the present invention, for achieving the objects mentioned above, there is provided a pointing device for detecting a slid distance and a slid direction of an operation key located approximately at the center of an opening section, generating signal strength information on the basis of the slid distance of the operation key, and generating a control signal corresponding to the signal strength information and the slid direction of the operation key, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates:

signal strength information for determining a strength of the control signal as zero in the case where the operation key is located within a circular area whose center is located at the original point and whose radius is n/N of the max_max (n and N are arbitrary positive integers, and n<N);

signal strength information on the basis of a predetermined rule of operation so that a strength of the control signal corresponds to the slid distance of the operation key in the case where the operation key is located within a toric area whose distance from the original point is larger than n/N of the max_max and smaller than the min_max; or signal strength information for determining a strength of the control signal so as to be identical to the strength when a slid distance of the operation key is the min_max in the case where the operation key is located within an area whose distance from the original point is larger than the min_max; and a strength of the control signal is fixed regardless of a slid direction of the operation key when the operation key is located at the position where a distance from the original point is the min_max.

In the second aspect, it is preferable to comprise a plurality of rules of operations for transforming the slid distance of the operation key into the signal strength information.

Moreover, in the second aspect with any configuration, it is preferable that:

the toric area is divided into a plurality of subareas by setting at least one circular arc as a boundary whose center is the original point; and the respective subareas have different variations of the signal strength information to the slid distance of the operation key.

Further, in the first or second aspect with any configuration, it is preferable to further comprises:

a section for measuring a temperature of an environment where the pointing device is used; and a section for correcting the detected slid distance of the operation key according to the temperature.

Moreover, in any configuration as described above, it is preferable to further comprises:

a push switch for detecting a push of the operation key, wherein:

the pointing device disables the push of the operation key detected by the push switch when the operation key is located outside a circular area whose center is the original point and whose radius is m/N of the max_max (m is an arbitrary positive integer, and m<N).

Furthermore, in any configuration as described above, it is preferable that:

the operation key is provided with a plurality of hall elements in the vicinity of the opening section; and the pointing device detects the slid direction and the slid distance of the operation key on the basis of magnetic flux density detected by the respective hall elements.

Moreover, in any configuration as described above, it is preferable that:

when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

According to a third aspect of the present invention, for achieving the objects mentioned above, there is provided an electronic apparatus comprising a pointing device for detecting a slid distance and a slid direction of an operation key located approximately at the center of an opening section to generate a control signal according to the detected slid distance and the slid direction, and a display section for displaying information, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates the control signal corresponding to the slid distance of the operation key by:

determining a strength of the control signal as zero in the case where the operation key is located within a circular area whose center is located at the original point and whose radius is n/N of the max_max (n and N are arbitrary positive integers, and n<N);

determining a strength of the control signal corresponding to the slid distance of the operation key on the basis of a predetermined rule of operation in the case where the operation key is located within a toric area whose distance from the original point is larger than n/N of the max_max and smaller than the min Max; or determining a strength of the control signal corresponding to a strength obtained when a slid distance of the operation key is the min_max in the case where the operation key is located within an area whose distance from the original point is larger than the min_max; and a display position of a controlled object displayed on the display section is changed on the basis of the control signal.

In the third aspect, it is preferable to comprise a plurality of rules of operations for transforming the slid distance of the operation key into the strength of the control signal.

Moreover, in the third aspect with any configuration, it is preferable that:

the toric area is divided into a plurality of subareas by setting at least one circular arc as a boundary whose center is the original point; and the respective subareas have different variations of the strength of the control signal to the slid distance of the operation key.

According to a fourth aspect of the present invention, for achieving the objects mentioned above, there is provided an electronic apparatus comprising a pointing device for detecting a slid distance and a slid direction of an operation key located approximately at the center of an opening section, generating signal strength information on the basis of the slid distance of the operation key, and generating a control signal corresponding to the signal strength information and the slid direction of the operation key, and a display section for displaying information, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates:

signal strength information for determining a strength of the control signal as zero in the case where the operation key is located within a circular area whose center is located at the original point and whose radius is n/N of the max_max (n and N are arbitrary positive integers, and n<N);

signal strength information on the basis of a predetermined rule of operation so that a strength of the control signal corresponds to the slid distance of the operation key in the case where the operation key is located within a toric area whose distance from the original point is larger than n/N of the max_max and smaller than the min_max; or signal strength information for determining a strength of the control signal so as to be identical to the strength when a slid distance of the operation key is the min_max in the case where the operation key is located within an area whose distance from the original point is larger than the min_max; and a strength of the control signal is fixed regardless of a slid direction of the operation key when the operation key is located at the position where a distance from the original point is the min_max; and a display position of a controlled object displayed on the display section is changed on the basis of the control signal.

In the fourth aspect, it is preferable to comprise a plurality of rules of operations for transforming the slid distance of the operation key into the signal strength information.

Moreover, in the fourth aspect with any configuration, it is preferable that:

the toric area is divided into a plurality of subareas by setting at least one circular arc as a boundary whose center is the original point; and the respective subareas have different variations of the signal strength information to the slid distance of the operation key.

Further, in the third or fourth aspect with any configuration, it is preferable to further comprise:

a section for measuring a temperature of an environment where the pointing device is used; and a section for correcting the detected slid distance of the operation key according to the temperature.

Furthermore, in the third or fourth aspect with any configuration, it is preferable to further comprise:

a push switch for detecting a push of the operation key, wherein:

the pointing device disables the push of the operation key detected by the push switch when the operation key is located outside a circular area whose center is the original point and whose radius is m/N of the max_max (m is an arbitrary positive integer, and m<N).

Moreover, in the third or fourth aspect with any configuration, it is preferable that:

the operation key is provided with a plurality of hall elements in the vicinity of the opening section; and the pointing device detects the slid direction and the slid distance of the operation key on the basis of magnetic flux density detected by the respective hall elements.

Furthermore, in the third or fourth aspect with any configuration, it is preferable that:

when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

BRIEF DESCRIPTION OF THE DRAWINGS

The objects and features of the present invention will become more apparent from the consideration of the following detailed description taken in conjunction with the accompanying drawings in which:

FIG. 3 is a flowchart for explaining the processes when changing a display position of a controlled object on a display screen using the pointing device of the first embodiment;

FIGS. 4A to 4E are diagrams showing examples of rules of operations to transform a slid distance of a slide key into a strength of a control signal;

FIG. 7 is a diagram showing that the areas set on the basis of min_max and max_max vary in size in respective pointing devices;

FIG. 12 is a diagram showing differences in respective rules of operations to transform a normalized slid distance into a strength of a control signal;

DESCRIPTION OF THE PREFERRED EMBODIMENTS

Figure 1:
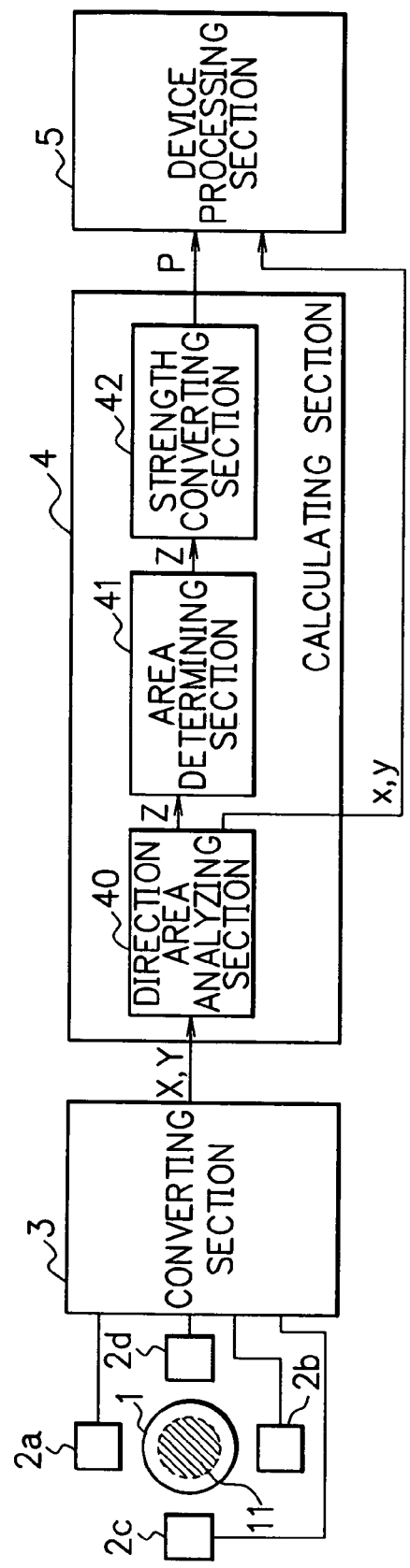
FIG. 1 is a diagram showing a configuration of a pointing device according to a first embodiment of the present invention.

Referring now to the drawings, embodiments of the present invention are explained in detail.

[First Embodiment]

In the following, an explanation will be given of an operation of a pointing device according to the first embodiment of the present invention.

FIG. 1 shows a configuration of a pointing device according to the first embodiment of the present invention. The pointing device comprises a slide key 1, hall elements 2 (2a, 2b, 2c, and 2d), a converting section 3, a calculating section 4, and a device processing section 5.

The slide key 1 is a key placed at an opening section formed to a housing. The slide key 1 is held with an elastic body from at least three directions on a sliding plane so as to be normally located approximately at the center of the opening section. The slide key 1 is placed so as to slide on an opening plane (x-y plane). A magnet 11 is fixed to (built-in, embedded in, attached to, etc.) the slide key 1, and moves with the slide key 1.

The hall elements 2 are sensors for detecting a variation of magnetic flux density generated with a move of the magnet 11, respectively. Incidentally, four hall elements 2a, 2b, 2c and 2d are set corresponding to a vertical direction and a horizontal direction of a display device where a controlled object is displayed. Hereat, the 2a–2b direction and the 2c–2d direction are defined as x direction and y direction, respectively.

The converting section 3 generates information indicating the position of the slide key 1 on an x-y coordinate system on the basis of the magnetic flux density detected by the respective hall elements 2. Namely, the converting section 3 converts the magnetic flux densities obtained as a result of the detection by the hall elements 2 into positional information of the slide key 1.

The calculating section 4 calculates a slid distance and a slid direction of the slide key 1 using the x-y information generated by the converting section 3. Further, the calculating section 4 determines the strength of a control signal according to the slid distance of the slide key 1. The device processing section 5 performs the operations of generating a control signal with the strength determined by the calculating section 4, moving a controlled object (such as a cursor and a pointer) on a display screen (or changing the displayed position), and the like.

The calculating section 4 comprises a direction area analyzing section 40, an area determining section 41, and a strength converting section 42.

The direction area analyzing section 40 calculates a slid direction and a slid distance from the original point of the magnet 11 on the basis of the positional information of the magnet 11 calculated by the converting section 3.

The area determining section 41 determines the area where the magnet 11 is located on the basis of the distance from the original point of the magnet 11, the distance being calculated by the direction area analyzing section 40. Incidentally, an explanation will be given of the areas set to the pointing device later.

The strength converting section 42 generates information indicating the strength of a control signal (expressed as "P") on the basis of the positional information of the slide key 1 and the area information where the slide key 1 is located.

Incidentally, among the slid distances in the respective directions when the slide key 1 is maximally slid (until the slide key 1 reaches the rim of the opening section), the maximum slid distance and the minimum slid distance are defined as max_max and min_max, respectively. This deviation is generated since the initial position (original position) of the slide key 1 is not always placed at the center of the opening section.

In order to strictly set the max_max and min_max, first, a user slides the slide key 1 until it reaches the rim of the opening section, and subsequently, slides it in a circular motion along the rim of the opening section. Otherwise, the user may slide the slide key 1 in main plural directions such as four directions above and below and right and left until the slide key reaches the rim of the opening section for simple setting.

Figure 2:
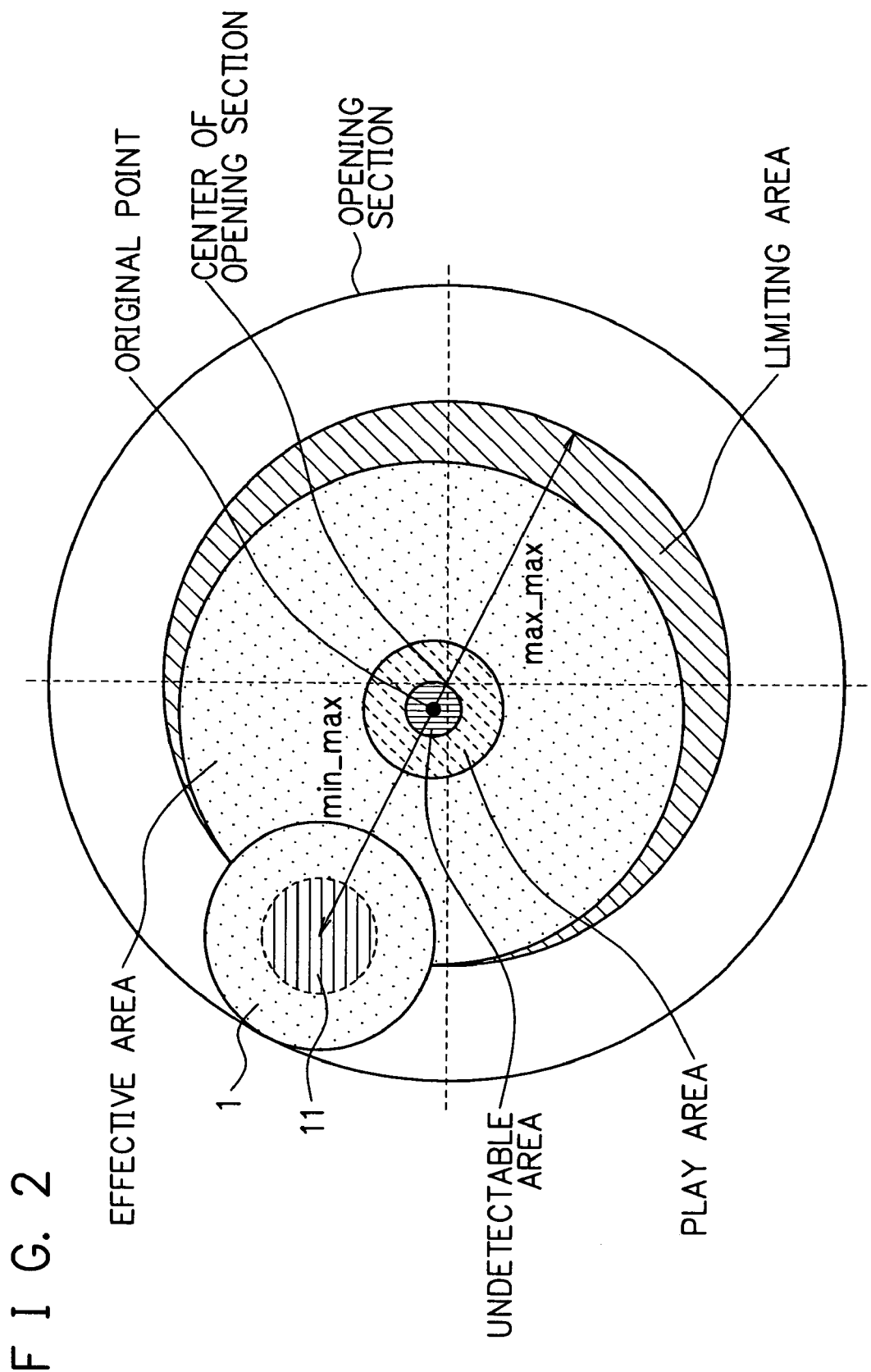
FIG. 2 is a diagram showing definitions of the respective areas set to the pointing device of the first embodiment.

FIG. 2 shows definitions of the respective areas where the slide key 1 is slidable in the pointing device of the first embodiment. In this embodiment, there are set an undetectable area, a play area, an effective area, and a limiting area from the inside of the opening section. The center of the respective areas is placed at the center of the original point.

First, an explanation will be given of the original point. The original point of the slide key 1 is a reference point for obtaining positional information of the slide key 1. The positional information generated by the converting section 3 is represented as, for example, (x, y) in the x-y coordinate system where the original point is determined as (0, 0). Accordingly, the slid distance of the slide key 1 is expressed as a distance from the original point to the (x, y) point (hereat, the distance is represented by "z"). Moreover, the slid direction of the slide key 1 is expressed as a direction from the original point toward the (x, y) point. Namely, the slid distance of the slide key 1 is represented as a size of a vector from the original point toward the (x, y) point, and the slid direction thereof is represented as a direction of a vector from the original point toward the (x, y) point.

As mentioned before, while the slide key 1 is held with an elastic body, it does not always returns to the initial point after being slid accurately. Accordingly, it is necessary to configure the pointing device so as to deal with the deviation from the position of the original point. One of the methods is to obtain predetermined pieces of positional information of the slide key 1 at plural position in the state where the slide key 1 is not slid to calculate the average, and to calculate the position of the original point.

For example, when the pointing device is mounted in an electronic apparatus, predetermined pieces of positional information of the slide key 1 at the time of turning on the power may be obtained. On the other hand, when the pointing device is mounted to a foldable electronic apparatus, predetermined pieces of positional information of the slide key 1 at the time of opening the folded electronic apparatus may be obtained. The respective areas described hereinbefore are determined by setting the original point thus calculated as a center. Incidentally, the position of the original point, information about the values of min_max and max_max and the like are stored in a memory (not shown).

When the position of the original point changes, max_max and min_max also changes. Accordingly, a pointing device may request a user to set again max_max and min_max according to need. For example, when setting again the original position, it is possible to display on a screen a message to urge a user to set again max_max and min_max when the positional deviation exceeds a predetermined amount (distance). Moreover, it is also possible for a user to set again max_max and min_max at an arbitrary timing.

Next, explanations will be given of the respective areas. The undetectable area is an area for reducing power consumption of the pointing device. In this area, if the slide key 1 slightly slides under the influence of vibration and the like, the hall elements 2 does not detect the changes of the magnetic flux densities as long as the slide key 1 is located within this area. The converting section 3, the calculating section 4 and the device processing section are not activated in this case.

The play area is an area for preventing malfunction of the pointing device, and serves as play by which the pointing device does not generate a control signal just when something touches the slide key 1. When the slide key 1 is located within this area, the strength converting section 42 determines a strength of a control signal as "0". Moreover, this area is effective in that, when the pointing device is provided with a push button function for detecting a push of a slide key 1, the pointing device does not detect displacement in a direction on the sliding plane accompanied by the push.

The play area is defined by a circle whose center is the original point and whose radius is n/N of max_max (n and N are positive integers, and n<N). By setting the play area on the basis of max_max, it becomes possible to secure a minimum radius to obtain required dimensions of the play area. Consequently, it becomes possible to prevent malfunctions caused by the deviation between the center of the opening section and the original point.

As described above, it is necessary to set the play area whose center is the original point to prevent malfunctions of the slide key 1 caused by the deviation between the center of the opening section and the original point. Accordingly, the size of the circle is determined on the basis of min_max or max_max.

When the maximum slid distance is defined as ave_max in the case where the slide key 1 is placed at the center of the opening section, min_max≦ave_max≦max_max. Min_max and max_max are variable values. Consequently, when a play area is set on the basis of min_max, the resultant area of the play area may be below a desired value. Therefore, it is necessary to set the play area on the basis of max_max.

For example, when min_max=0.8 mm, ave_max=0.9 mm, max_max=1.0 mm, and when there is a need to secure a circular area with radius 0.3 mm at the minimum as a play area, it is necessary to set 34% of max_max to the radius of the play area. By this setting, no matter how much the max_max changes, the radius of the play area will not be below the desired value (0.3 mm).

On the other hand, when 38% of max_max is set to the radius of the play area, the radius of the play area also becomes 0.3 mm or more. However, this is not preferable since the radius of the play area will be below the desired value when the position of the original point changes and the min_max becomes much smaller.

The effective area is an area for enabling functions of the pointing device. When the magnet 11 is located within the effective area, the strength converting section 42 determines a strength of a control signal according to the slid distance of the slide key 1 on the basis of a predetermined rule of operation. The effective area is defined as a toric (circular) area where max_max·n/N<r<min_max (r: the distance from the original point).

The limiting area is defined as a C-shaped area where min_max<r<max_max (r: the distance from the original point). When the magnet 11 is located within this area, the strength converting section 42 determines the strength of a control signal on the assumption that the slid distance of the slide key 1 is min_max.

Incidentally, when it is under the ideal condition that the original point is placed at the center of the opening section (namely, min_max=max_max), the respective areas described above are concentric circles whose centers are placed at the center of the opening section.

FIG. 3 shows a flow of operation when moving a controlled object on a display screen using the pointing device according to the first embodiment.

When a user slides the slide key 1, the magnet 11 moves with the slide key 1 and the magnetic flux density detected by the respective hall elements 2 changes (Step S101). The converting section 3 calculates positional information "X, Y" of the slide key 1 on the basis of the detected result of the magnetic flux density at the respective hall elements 2, and outputs the calculated positional information to the calculating section 4. The direction area analyzing section 40 calculates a slid distance "Z" of the magnet 11 on the basis of "X" and "Y". Namely, the direction area analyzing section 40 converts the detected result of the magnetic flux density at the respective hall elements 2 into a slid distance and a resultant position of the slide key 1 (Step S102). The direction area analyzing section 40 outputs the slid distance "Z" of the slide key 1 to the area determining section 41. Moreover, the direction area analyzing section 40 outputs the position "x, y" of the slide key 1 to the device processing section 5.

The area determining section 41 determines the area where the slide key 1 is located on the basis of the slid distance "Z" of the slide key 1 (Step S103).

When the slide key 1 is located within the play area (Step S103/PLAY AREA), the strength converting section 42 determines the strength of a control signal as "0" (Step S104). Moreover, when the slide key 1 is located within the effective area (Step S103/EFFECTIVE AREA), the strength converting section 42 determines the strength of a control signal according to the slid distance of the slide key 1 (Step S105). Furthermore, when the slide key 1 is located within the limiting area (Step S103/LIMITING AREA), the strength converting section 42 determines the strength of a control signal according to the slid distance on the assumption that the slid distance of the magnet 11 is min_max (Step S106).

When the slide key 1 is located within the effective area or the limiting area, the device processing section 5 outputs a control signal corresponding to the slid direction of the slide key 1 with the strength determined by the strength converting section 42 to perform the processes of moving a controlled object on a display screen in the direction of "x, y", and the like (Step S107).

FIGS. 4A to 4E show examples of rules of operations when the strength converting section 42 transforms a slid distance of a slide key 1 into a strength of a control signal. The vertical axis denotes a strength of a control signal, and the horizontal axis denotes a slid distance of the slide key 1. FIG. 4A shows a case where the strength of a control signal is changed in proportion to the slid distance of the slide key 1 when the slide key 1 is located in the effective area. When the magnet 11 is located within the play area, the strength of a control signal is "0". When the slide key 1 is located within the effective area, the strength of a control signal increases linearly from the initial value "P0". When the slid distance reaches the min_max, the strength converting section 42 stops the increase of the strength of a control signal, and does not increase the strength any more even when the slid distance further increases.

Moreover, the effective area may be divided into plural subareas to increase the strength of a control signal at a different ratio, respectively. FIG. 4B shows an example of the strength of a control signal when the effective area is divided into two subareas. In this case, the strength converting section 42 gradually increases the strength of a control signal when the slid slide key 1 reaches the effective area. After the slide key 1 reaches the outer subarea, the ratio of increase of the strength becomes large.

Further, the effective area may be subdivided. By this means, it becomes possible to increase the signal strength in a staircase pattern as shown in FIG. 4C and at an accelerating pace as shown in FIG. 4D. Incidentally, the strength converting section 42 may determine the strength of a control signal so as to keep a fixed value when the slide key 1 is located within the effective area as shown in FIG. 4E.

By this means, in the pointing device according to the first embodiment, the play area is set on the basis of max_max. Thereby, it becomes possible to certainly prevent the generation of malfunctions of the slide key 1 caused by the deviation between the center of the opening section and the original point. Further, it becomes possible to generate a fixed maximum value of a control signal regardless of a slid direction of the slide key 1.

Namely, according to the first embodiment, there is provided a pointing device with good operationality.

Incidentally, while in the above explanation the direction area analyzing section 40 is included in the calculating section 4, it may be included in the converting section 3 or be independent from the respective sections.

[Second Embodiment]

In the following, an explanation will be given of an operation of a pointing device according to the second embodiment of the present invention.

Figure 5:
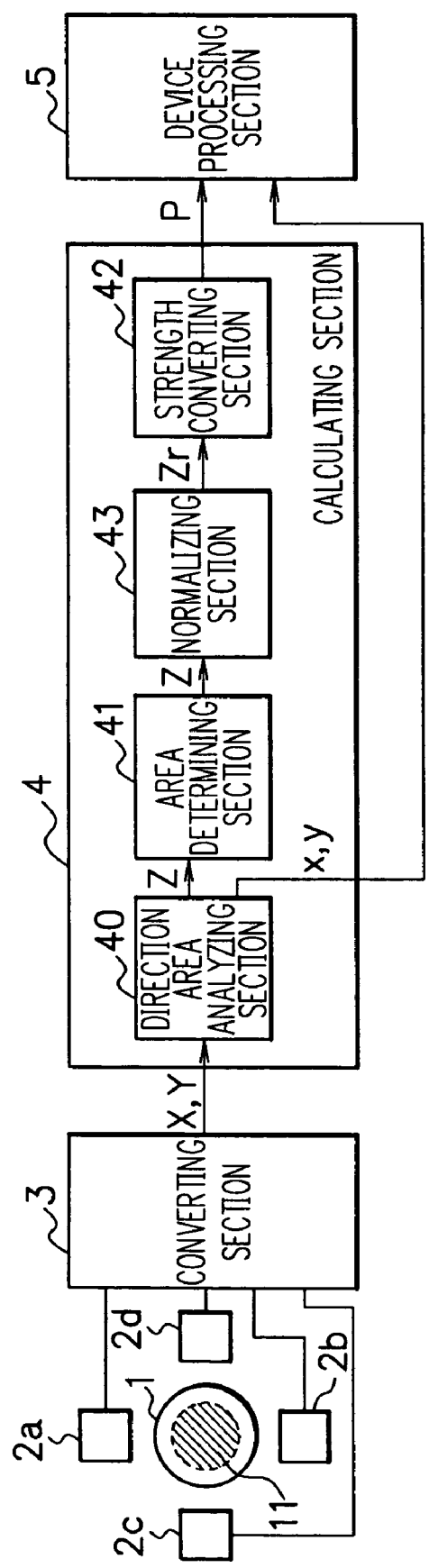
FIG. 5 is a diagram showing a configuration of a pointing device according to a second embodiment of the present invention.

FIG. 5 shows a configuration of a pointing device according to the second embodiment. The pointing device of this embodiment comprises a slide key 1, hall elements 2, a converting section 3, a calculating section 4, and a device processing section 5 as with the first embodiment.

The calculating section 4 of this embodiment further includes a normalizing section 43. The normalizing section 43 normalizes the slid distance of the slide key 1, the slid distance being generated by the converting section 3, to output the normalized value as "Zr". Moreover, the device processing section 5 generates a control signal corresponding to the slid direction of the slide key 1 with the strength determined according to the normalized slid distance. The other sections operate in the same manner as described in the first embodiment.

Figure 6:
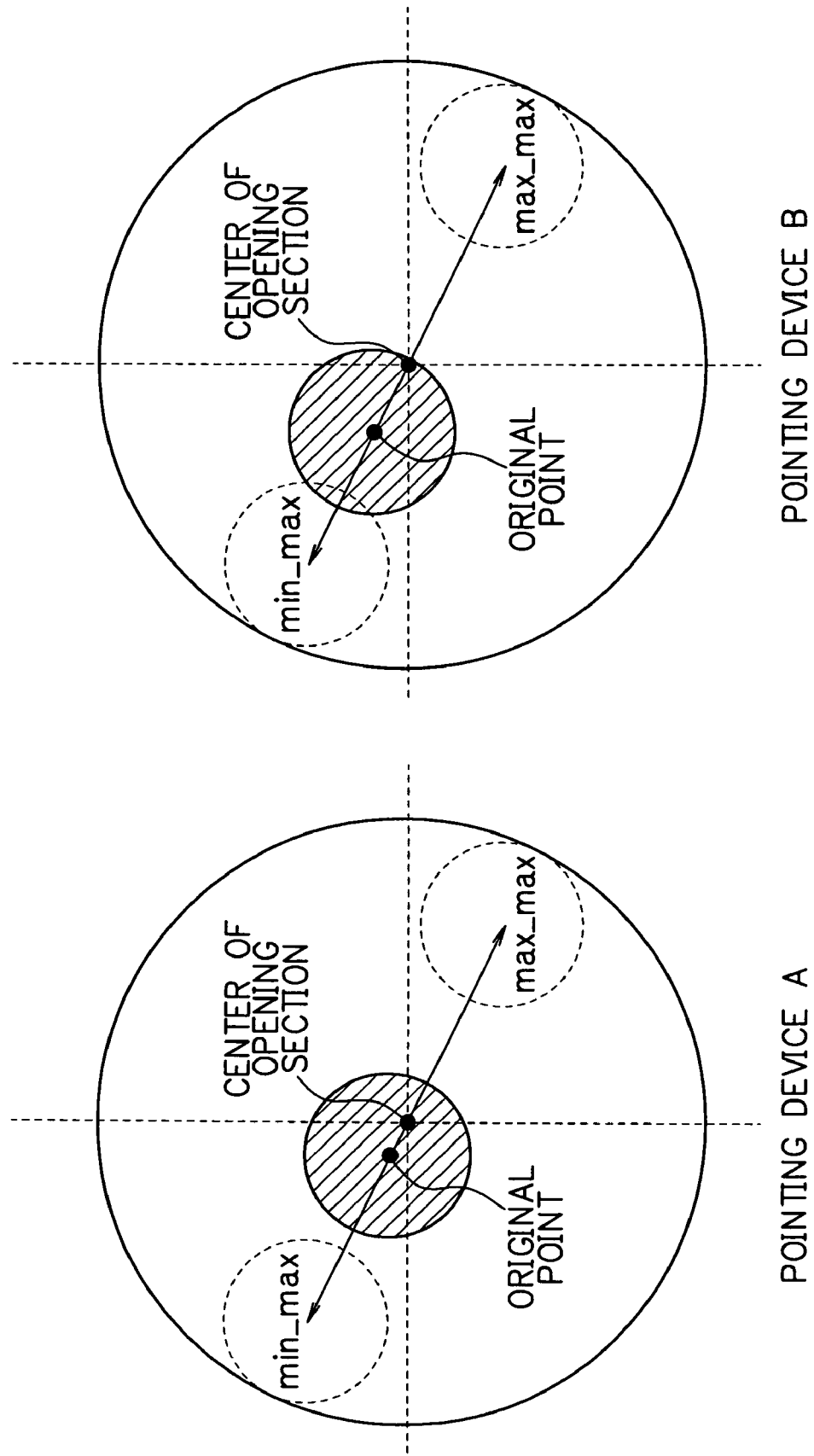
FIG. 6 is a diagram showing that the distances of min_max and max_max are different in respective pointing devices.

As shown in FIG. 6, min_max and max_max vary according to respective pointing devices. Accordingly, the sizes of the play area, the effective area, and the like also vary according to respective pointing devices as shown in FIG. 7. Therefore, when the strength converting section 42 directly determines the strength of a control signal according to the slid distance of the slide key 1 (namely, the slid amount of the magnet 11), the maximum value of the control signal varies according to respective pointing devices, which leads to variations of operationality according to respective devices.

In this embodiment, the normalizing section 43 normalizes the slid distance of the slide key 1 and outputs it. Accordingly, it becomes possible to prevent the difference in operationality between respective devices.

Figure 8:
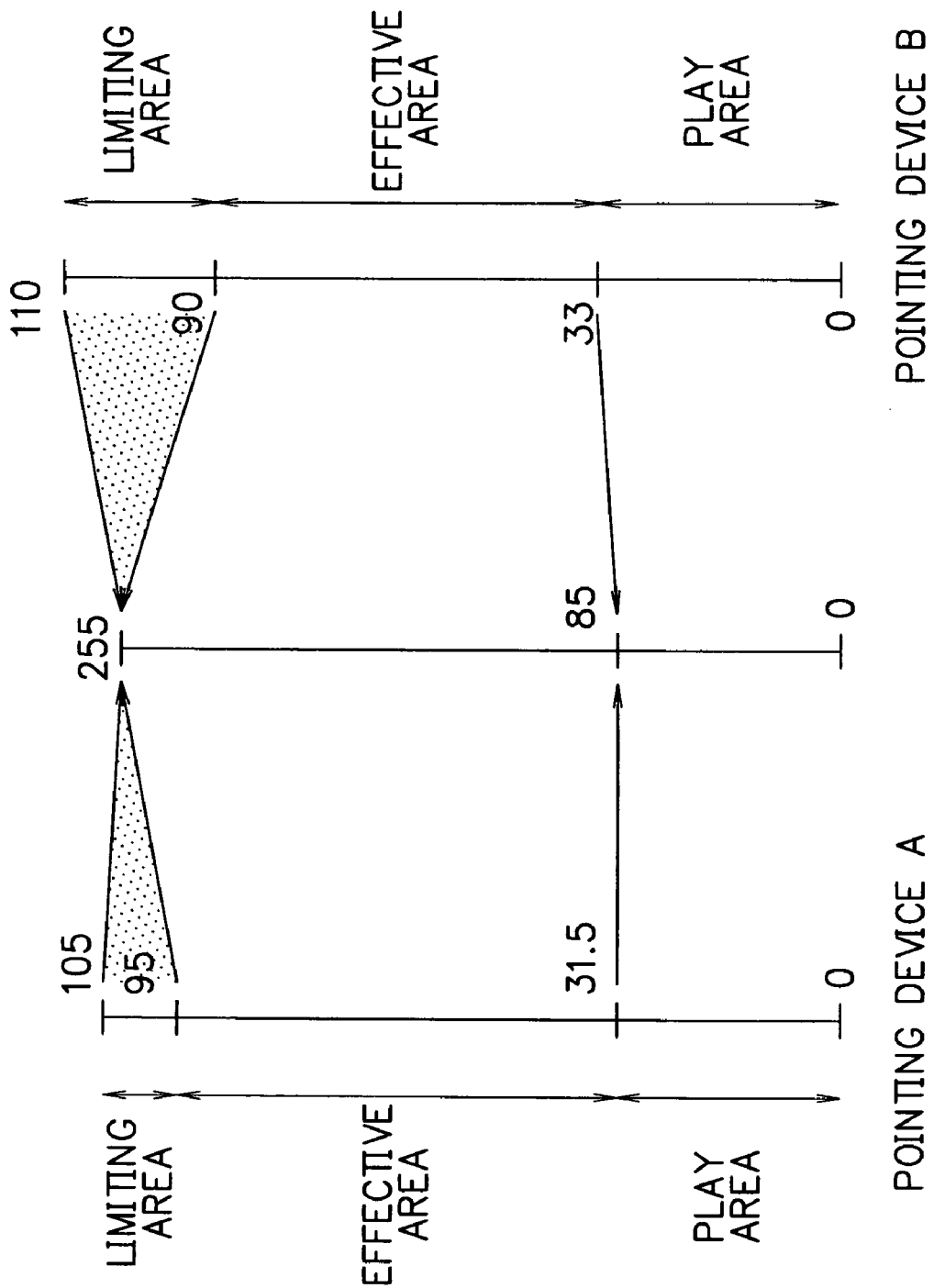
FIG. 8 is a diagram showing processes by a normalizing section.

FIG. 8 shows an example of processes executed by the normalizing section 43. The normalizing section 43 normalizes the slid distance of the slide key 1 by converting the positional information of the slide key 1 into a quantized value of n bits (in this example, 8 bits), and outputs it.

For example, the distance from the original point to the boundary between the play area and the effective area is "31.5" in the pointing device A and "33" in the pointing device B. The normalizing section 43 in the respective devices A and B both converts the values into "85" and outputs it. Moreover, the distance from the original point to the boundary between the effective area and the limiting area is "95" in the device A and "90" in the device B. In this case, the respective normalizing sections 43 convert the values into "255" and output it.

Further, when the slide key 1 is located within the play area and the effective area, the normalizing section 43 normalizes the slid distance of the slide key 1 with serial values so as to output "0" at the original point, "85" at the boundary between the play area and the effective area, and "225" at the boundary between the effective area and the limiting area. Moreover, when the slide key 1 is positioned within the limiting area, the normalizing section 43 converts the slid distance of the slide key 1 into "255" for normalization.

As described above, the normalizing section 43 converts the positional information of the slide key 1 into a quantized value. Accordingly, it becomes possible to achieve the same operationality regardless of different pointing devices.

Figure 9:
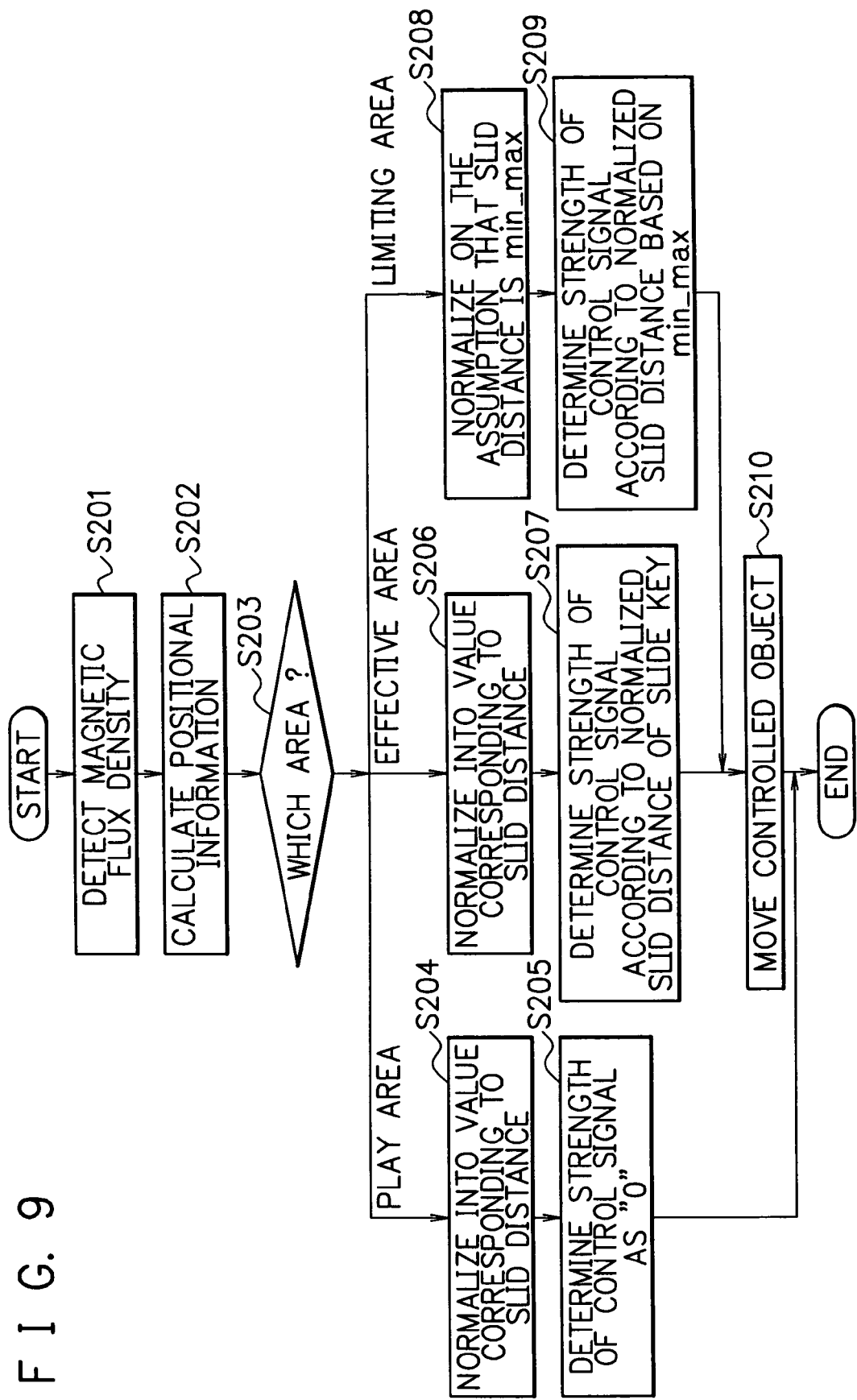
FIG. 9 is a flowchart for explaining the processes when changing a display position of a controlled object on a display screen using the pointing device of the second embodiment.

FIG. 9 shows a flow of operation when moving a controlled object using the pointing device according to the second embodiment.

The Steps S201 to S203 are the same as the Steps S101 to S103 as shown in FIG. 3 in the first embodiment.

When the area determining section 41 determines that the slide key 1 is located in the play area (Step S203/PLAY AREA), while the normalizing section 43 outputs a normalized value according to the positional information of the slide key 1 (Step S204), the strength converting section 42 determines the strength of a control signal as "0" (Step S205).

When the area determining section 41 determines that the slide key 1 is located in the effective area (Step S203/EFFECTIVE AREA), the normalizing section 43 converts the slid distance of the slide key 1 into a normalized value (Step S206). Subsequently, the strength converting section 42 determines the strength of a control signal according to the normalized slid distance of the slide key 1 on the basis of a predetermined rule of operation (Step S207).

When the area determining section 41 determines that the slide key 1 is located in the limiting area (Step S203/LIMITING AREA), the normalizing section 43 outputs a normalized value on the assumption that the slid distance of the slide key 1 is min_max (Step S208). Subsequently, the strength converting section 42 determines the strength of a control signal according to the normalized slid distance on the assumption that the slid distance is min_max (Step S209).

When the slide key 1 is located within the effective area or the limiting area, the device processing section 5 outputs a control signal corresponding to the slid direction of the slide key 1 with the strength determined by the strength converting section 42 to execute processes of moving a controlled object on a display screen, and the like (Step S210).

By this means, it becomes possible not only to obtain the same effects as those obtained in the first embodiment but also to obtain the same operationality regardless of different pointing devices.

[Third Embodiment]

In the following, an explanation will be given of an operation of a pointing device according to the third embodiment of the present invention.

Figure 10:
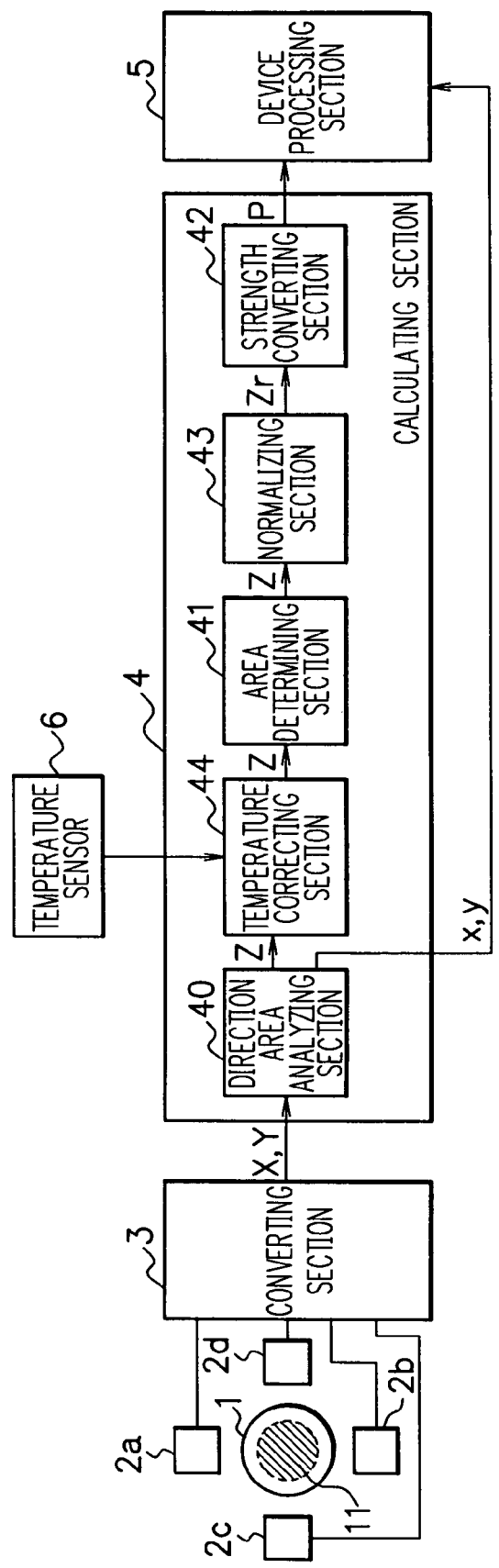
FIG. 10 is a diagram showing a configuration of a pointing device according to a third embodiment of the present invention.

FIG. 10 shows a configuration of a pointing device according to the third embodiment. The pointing device comprises a slide key 1, hall elements 2, a converting section 3, a calculating section 4, a device processing section 5 and a temperature sensor 6.

In this embodiment, the calculating section 4 further includes a temperature correcting section 44 in addition to the configuration of the pointing device in the second embodiment.

The temperature correcting section 44 corrects the difference in sensitivity of the hall elements 2 according to the changes in temperature of an environment where the pointing device is used.

The temperature sensor 6 is a sensor for measuring a temperature of an environment where the pointing device is used.

In this embodiment, the slid direction and the slid distance of the slide key 1 are detected using the magnet 11 and the hall elements 2. However, under the different temperatures, the magnetic flux density detected by the respective hall elements 2 changes even if the slide key 1 is moved by the same distance. To be concrete, since a magnetic force generated from the magnet 11 is weakened as the temperature rises, the higher the temperature of the environment where the pointing device is used, the more the magnetic flux density detected by the respective hall elements 2 is reduced. Consequently, it is necessary to correct a slid distance of the slide key 1 according to the temperature of the environment where the pointing device is used. Otherwise, variations are generated in the strength determined by the strength converting section 42 and in operationality.

In the pointing device according to the third embodiment, the temperature correcting section 44 corrects the slid distance of the slide key 1 on the basis of a detected result of the temperature sensor 6. By this means, it becomes possible to generate the same control signal regardless of changes in temperature where the pointing device is used.

Incidentally, the operation of the pointing device of the third embodiment is the same as that in the second embodiment except that the temperature correcting section 44 corrects the slid distance "Z" of the slide key 1, which is an output from the direction area analyzing section 40.

As described above, in the pointing device according to the third embodiment, it becomes possible not only to obtain the same effects as those obtained in the second embodiment but also to achieve the same operationality regardless of the temperature where the pointing device is used.

[Fourth Embodiment]

In the following, an explanation will be given of an operation of a pointing device according to the fourth embodiment of the present invention.

Figure 11:
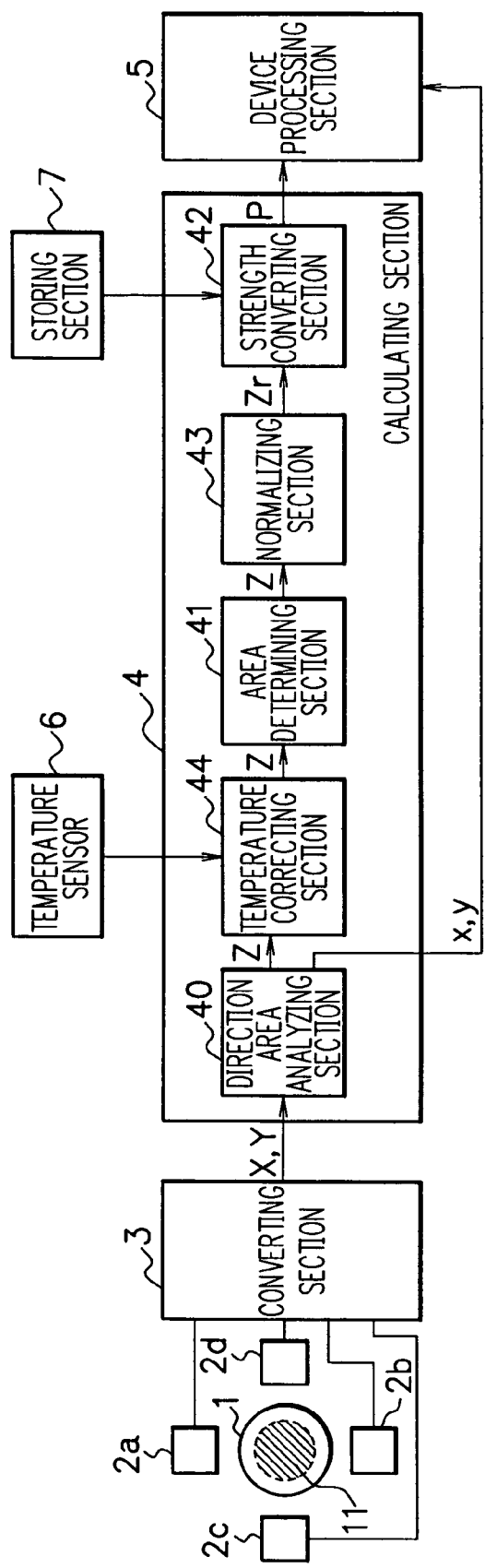
FIG. 11 is a diagram showing a configuration of a pointing device according to a fourth embodiment of the present invention.

FIG. 11 shows a configuration of a pointing device according to the fourth embodiment. The pointing device comprises a slide key 1, hall elements 2, a converting section 3, a calculating section 4, a device processing section 5, a temperature sensor 6, and a storing section 7.

The storing section 7 stores a plurality of rules of operations used when the strength converting section 42 transforms a slid distance of the slide key 1 into a strength of a control signal. Incidentally, the other sections operate in the same manner as in the third embodiment.

FIG. 12 shows an example of a rule of operation stored in the storing section 7. The vertical axis denotes a strength of a control signal, and the horizontal axis is a normalized slid distance. For example, in the case where the rule (a) is applied, when a value obtained by normalizing a slid distance of the slide key 1 falls within the subarea 1, the increasing rate of the strength of a control signal according to the normalized slid distance is smaller than that of rule (b). Moreover, when the value obtained by normalizing a slid distance of the slide key 1 falls within the subarea 2, the increasing rate of the strength of a control signal according to the normalized slid distance is larger than that of the rule (b).

A user can select a suitable rule of operations from the plural rules stored in the storing section 7 to customize the operationality of the pointing device.

By this means, it becomes possible not only to obtain the same effects as those obtained in the third embodiment but also to obtain satisfactory operationality by changing the strength of a control signal generated when sliding the slide key 1 according to user's taste.

[Fifth Embodiment]

In the following, an explanation will be given of an operation of a pointing device according to the fifth embodiment of the present invention.

Figure 13:
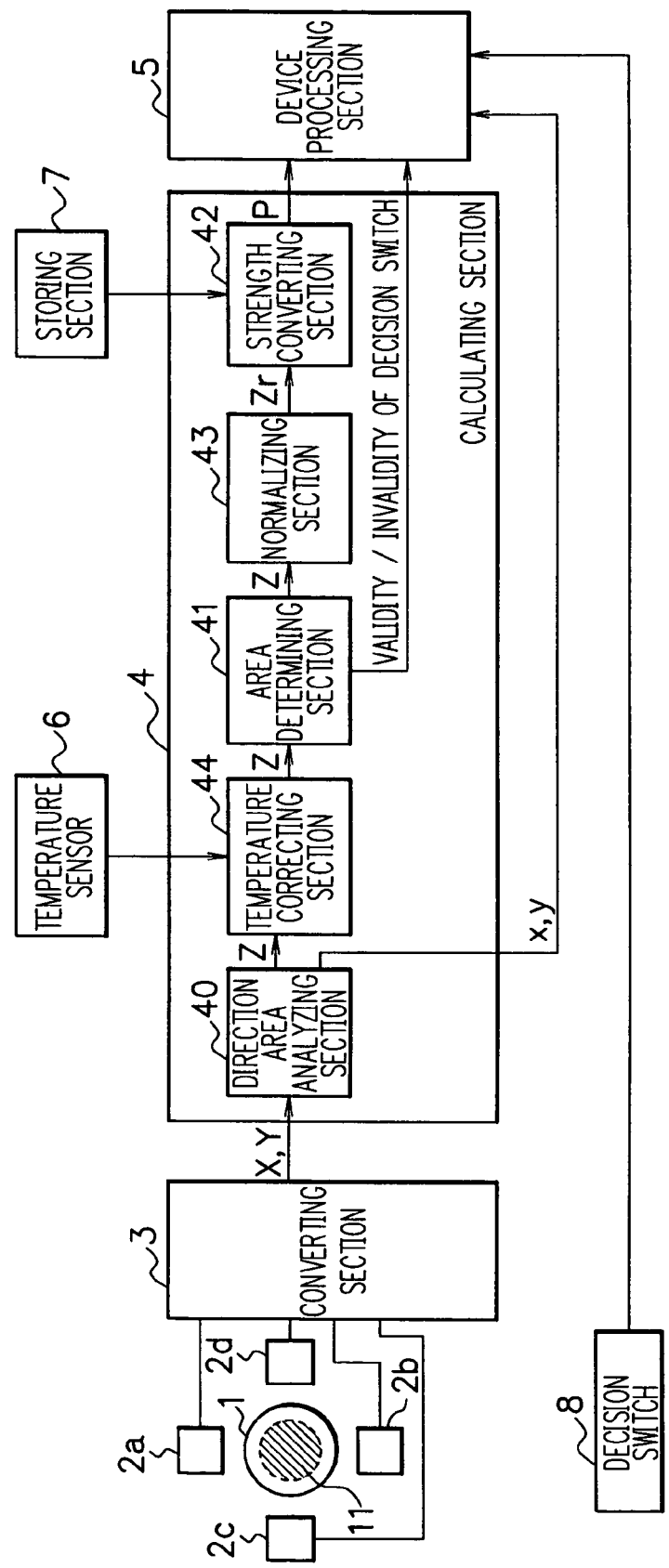
FIG. 13 is a diagram showing a configuration of a pointing device according to a fifth embodiment of the present invention.

FIG. 13 shows a configuration of a pointing device according to the fifth embodiment. The pointing device comprises a slide key 1, hall elements 2, a converting section 3, a calculating section 4, a device processing section 5, a temperature sensor 6 and a storing section 7 and a decision switch 8.

In this embodiment, the slide key 1 has a function as a push button. The decision switch 8 is a switch for detecting a push of the slide key 1. Incidentally, the other sections operate in the same manner as in the fourth embodiment.

When the slide key is provided with a function as a push button like the pointing device of this embodiment, a user may wrongly push the slide key 1 while intending to slide it. Therefore, when the slid distance of the slide key 1 is a predetermined value or more, it is preferable that the decision switch 8 disables a push of the slide key 1 in view of operationality even if the decision switch 8 detects the push.

Figure 14:
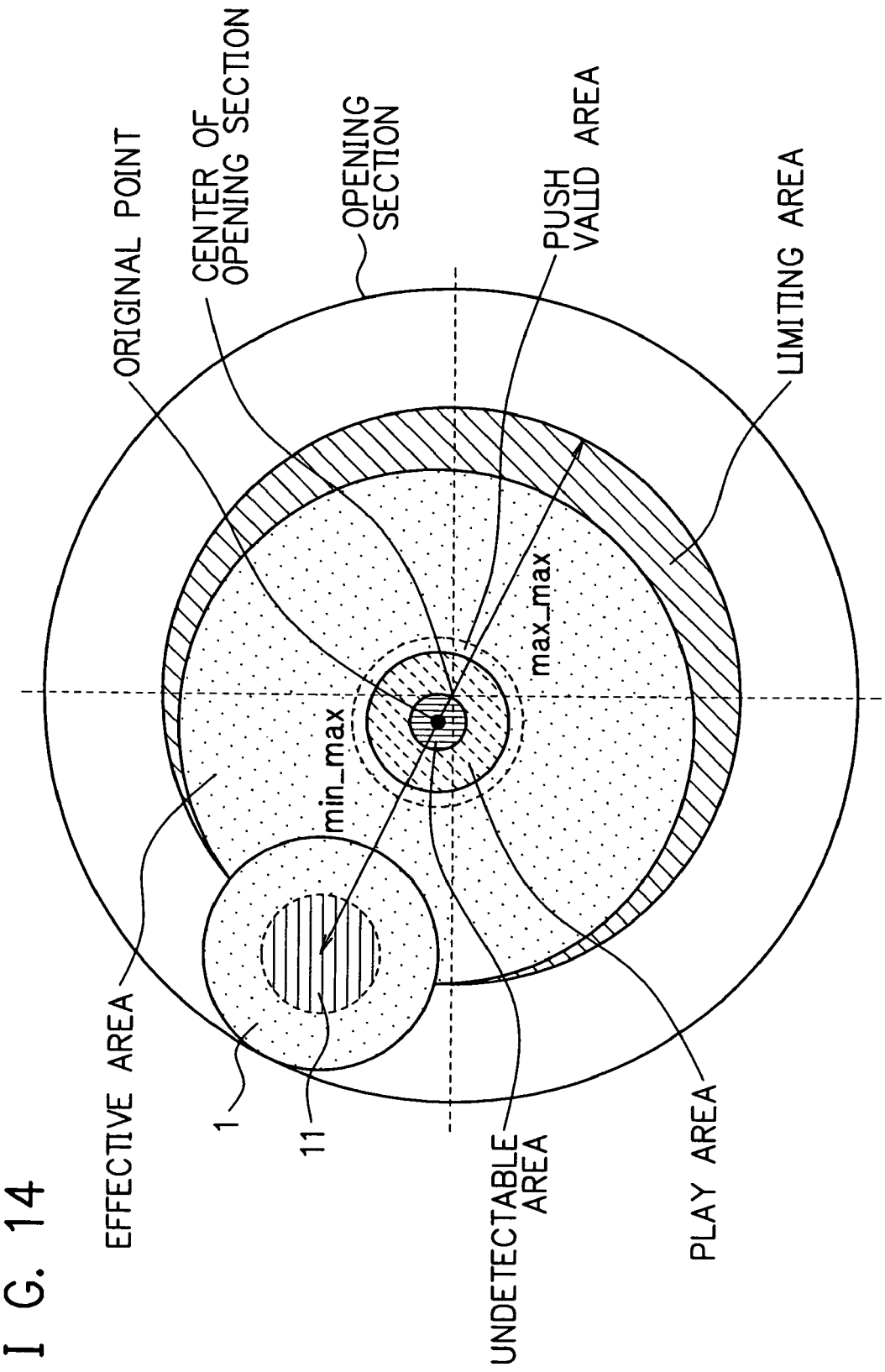
FIG. 14 is a diagram showing definitions of respective areas set to the pointing device of the fifth embodiment.

FIG. 14 shows definitions of areas where the slide key 1 is slidable in the pointing device of this embodiment. In this embodiment, a push valid area to enable the detected result of the decision switch 8 is provided in addition to respective areas as shown in FIG. 2 in the first embodiment.

The push valid area is defined as a circular area with a radius of m/N of max_max (m is an arbitrary positive integer, and m<N), and the center of the circular area is the original point. The push valid area is determined on the basis of max_max in the same manner as determining the play area as explained in the first embodiment. Accordingly, it becomes possible to secure a minimum radius to obtain a required push valid area.

Incidentally, the push valid area is an area overlapped with the other area(s), namely, the push valid area is not independent from the other area(s). Accordingly, when overlapped with the other area(s), the push valid area has both characteristics of the respective areas.

Figure 15:
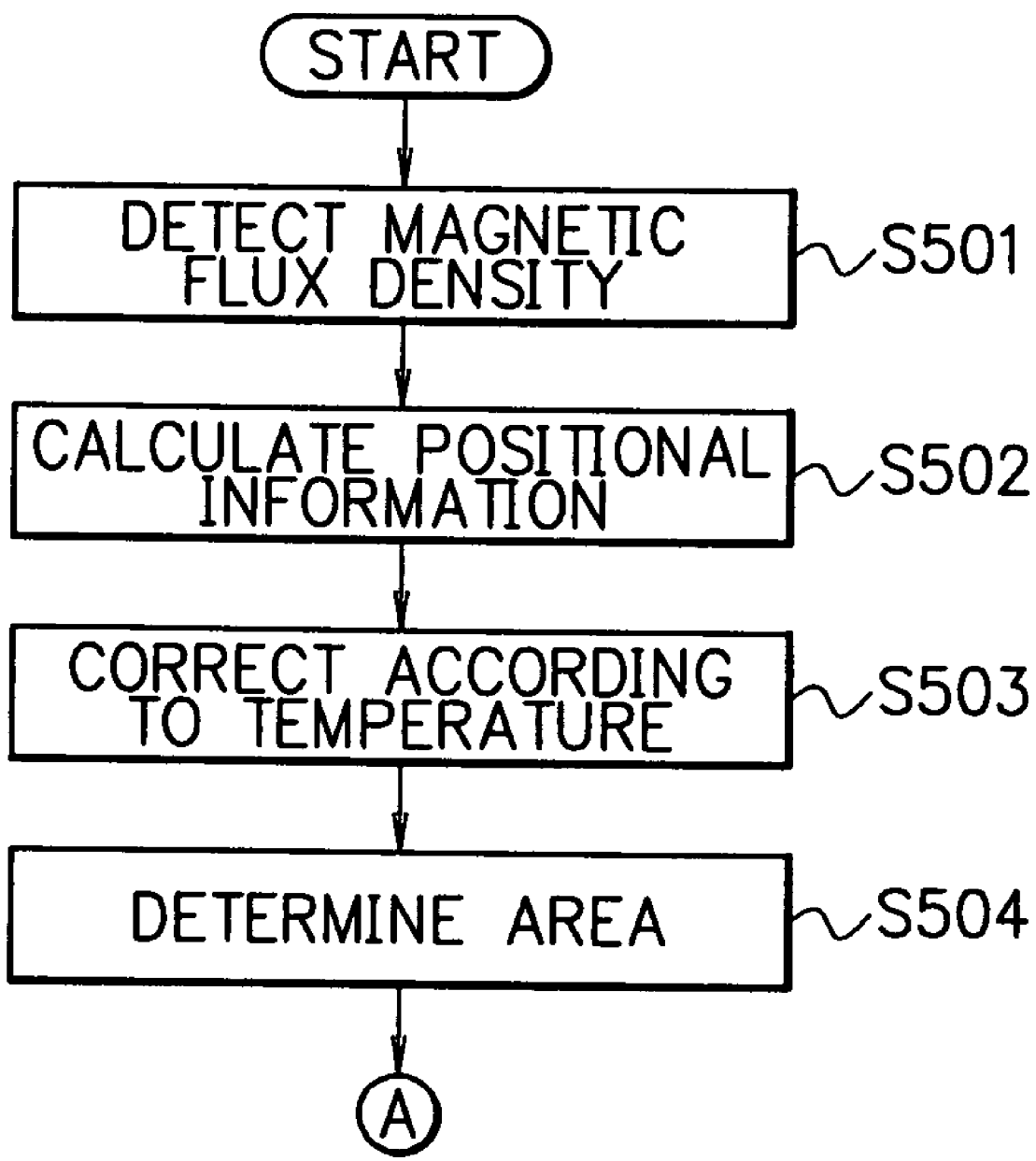
FIG. 15 is a flowchart for explaining the processes when changing a display position of a controlled object on a display screen using the pointing device of the fifth embodiment.
Figure 16:
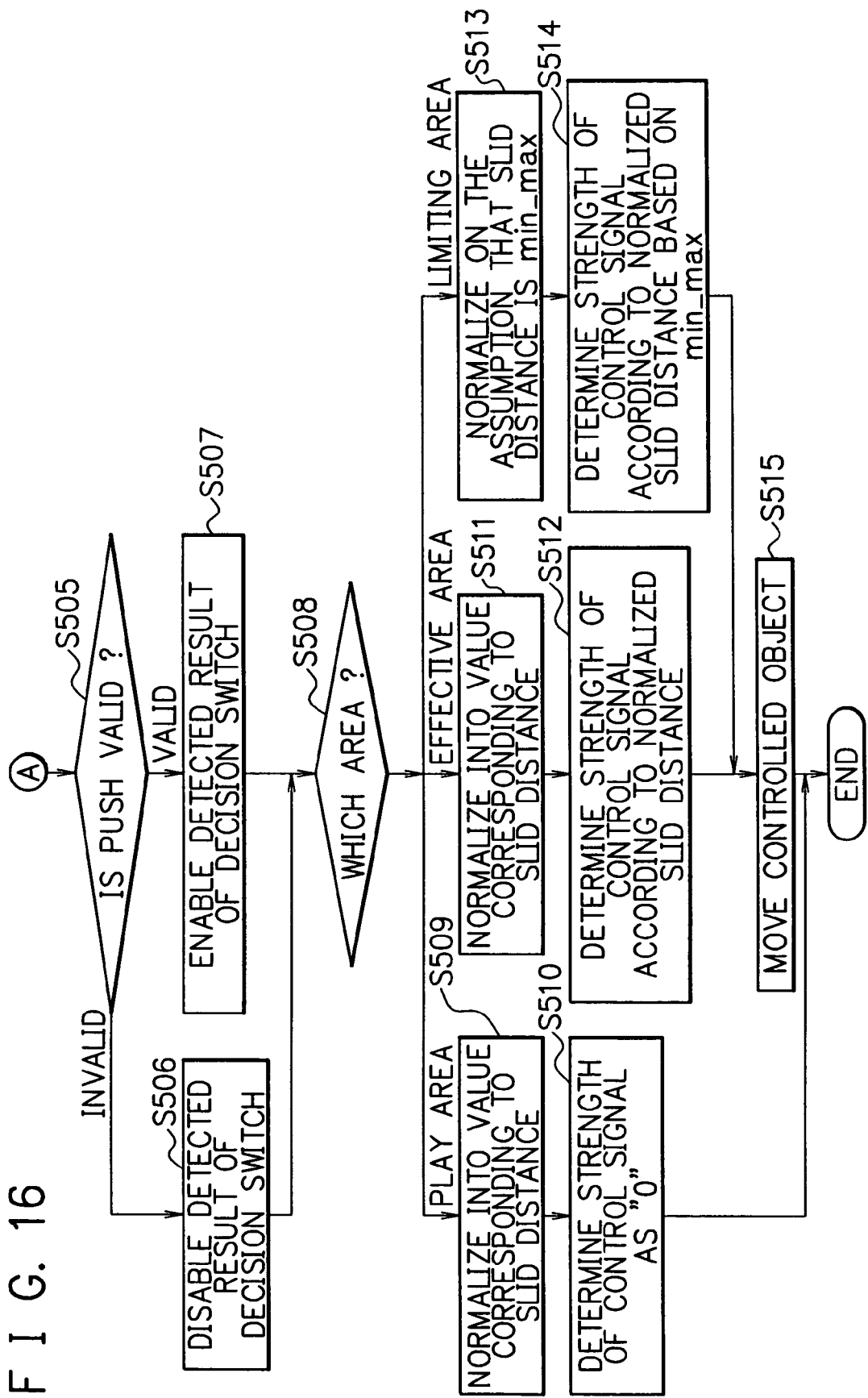
FIG. 16 is a flowchart for explaining the processes when changing a display position of a controlled object on a display screen using the pointing device of the fifth embodiment.

FIGS. 15 and 16 show a flow of operation when moving a controlled object displayed on a screen using the pointing device of the fifth embodiment.

When a user slides the slide key 1, the magnet 11 moves with the slide key 1 and the magnetic flux density detected by the respective hall elements 2 changes (Step S501).

The converting section 3 calculates positional information of the slide key 1 on the basis of the detected result of the magnetic flux density detected by the respective hall elements 2, and outputs the calculated information to the calculating section 4. The direction area analyzing section 40 calculates the distance (slid amount) "Z" on the basis of the positional information of the slide key 1. Subsequently, the direction area analyzing section 40 outputs the slid distance "Z" of the slide key 1 to the temperature correcting section 44. Moreover, the analyzing section 40 outputs the position "x, y" of the slide key 1 to the device processing section 5 (Step S502).

The temperature correcting section 44 corrects the distance of the slide key 1 on the basis of the detected result of the temperature sensor 6 so as to indicate a value obtained under a predetermined temperature (for example, 20° C.) (Step S503), and outputs the corrected value to the area determining section 41.

The area determining section 41 determines the area where the slide key 1 is located on the basis of the distance of the slide key 1 (Step S504).

When the slide key 1 is not located within the push valid area (Step S505/INVALID), the area determining section 41 transmits a signal to disable the detected result of the decision switch 8 to the device processing section 5, and disables the detected result (Step S506). Namely, when the slide key 1 is not located in the push valid area, the device processing section 5 does not execute processes associated with the push of the slide key 1 even when the decision switch 8 detects the push of the slide key 1.

On the other hand, when the slide key 1 is located within the push valid area (Step S505/VALID), the area determining section 41 transmits a signal to enable the detected result of the decision switch 8 to the device processing section 5, and enables the detected result (Step S507). Namely, when the slide key 1 is located in the push valid area, the device processing section 5 performs the controls associated with the push of the slide key 1 when the decision switch 8 detects the push of the slide key 1.

Subsequently, when the area determining section 41 determines that the slide key 1 is located in the play area as a result of area determination (Step S508/PLAY AREA), while the normalizing section 43 outputs a normalized value according to the positional information of the magnet 11 (Step S509), the strength converting section 42 determines the strength of a control signal as "0" (Step S510).

Further, when the area determining section 41 determines that the slide key 1 is located in the effective area (Step S508/EFFECTIVE AREA), the normalizing section 43 converts the slid distance of the slide key 1 into a normalized value (Step S511). The strength converting section 42 determines the strength of a control signal according to the normalized slid distance of the slide key 1 (Step S512).

When the area determining section 41 determines that the slide key 1 is located in the limiting area (Step S508/LIMITING AREA), the normalizing section 43 outputs a normalized value on the assumption that the slid distance of the slide key 1 is min_max (Step S513). Subsequently, the strength converting section 42 determines the strength of a control signal according to the normalized value on the assumption that the slid distance of the slide key 1 is min_max (Step S514).

When the slide key 1 is located in the effective area or the limiting area, the device processing section 5 outputs a control signal corresponding to the slid direction of the slide key 1 with the strength determined by the strength converting section 42 to execute processes of moving a controlled object on a screen, and the like (Step S515).

Figure 17:
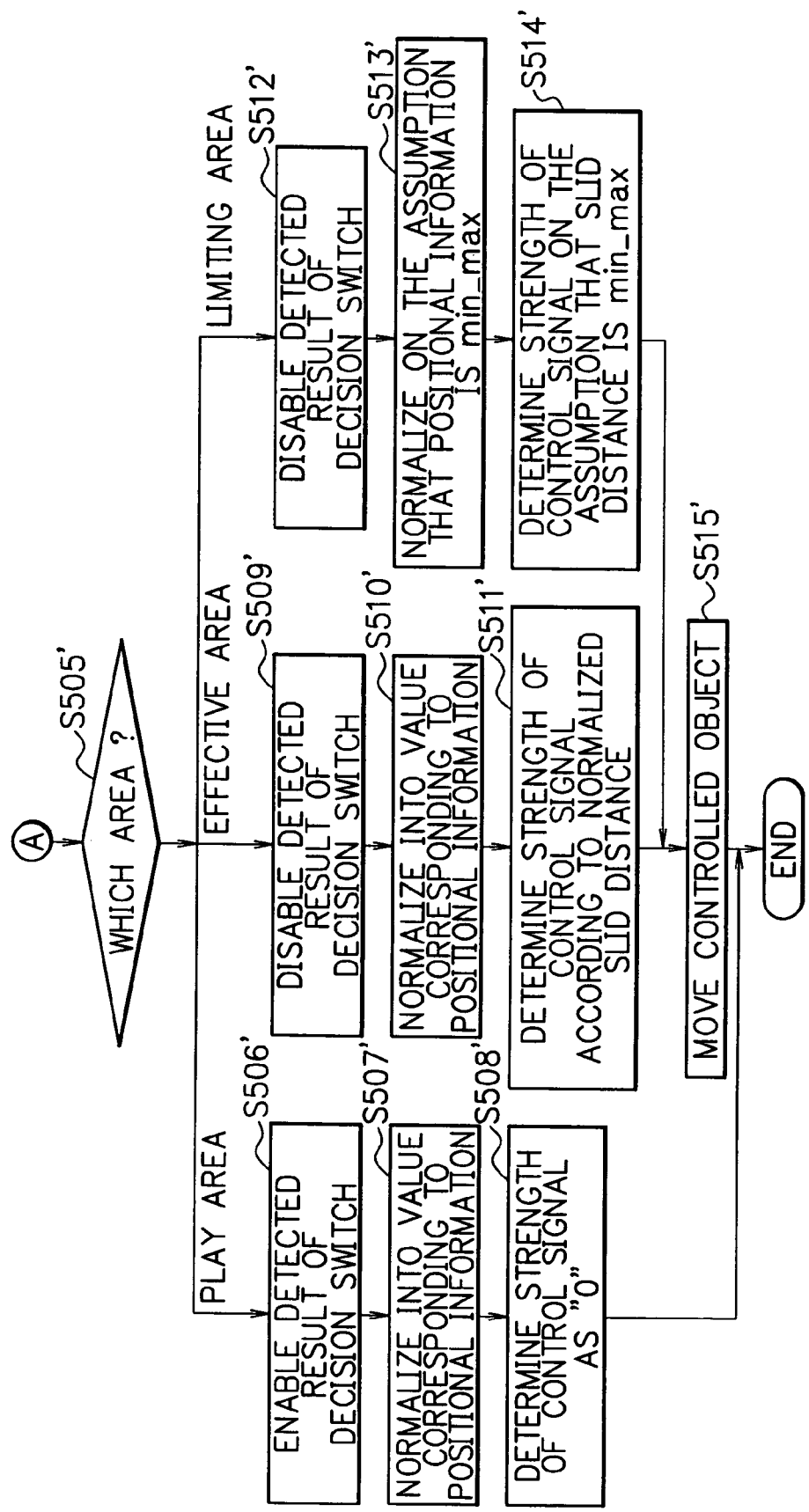
FIG. 17 is a flowchart for explaining the processes when changing a display position of a controlled object on a display screen using the pointing device of the fifth embodiment.

By the operation as described hereinbefore, it becomes possible to disable the function as a push button when a slid distance of the slide key 1 is equal to or more than a predetermined amount. Incidentally, while the push valid area is defined as a circular area with an arbitrary radius which satisfies 0<m<N, it is preferable that the size of the push valid area is approximately identical to the size of the play area (namely, n≈m). FIG. 17 shows an example of a flow in this case.

As a result of the area determination at the Step S504, when determining that the slide key 1 is located within the play area (Step S505'/PLAY AREA), the area determining section 41 transmits a signal to enable the detected result of the decision switch 8 to the device processing section 5, and enables the detected result (Step S506'). Namely, in the case where the slide key 1 is located in the play area, the device processing section 5 executes controls associated with the push of the slide key when the decision switch 8 detects a push of the slide key 1.

Subsequently, while the normalizing section 43 outputs a normalized value according to the positional information of the magnet 11 (Step S507'), the strength converting section 42 determines the strength of a control signal as "0" (Step S508').

When determining that the slide key 1 is located in the effective area (Step S505'/EFFECTIVE AREA), the area determining section 41 transmits a signal to disable the detected result by the decision switch 8 to the device processing section 5, and disables the detected results (Step S509'). Namely, in the case where the slide key 1 is located in the effective area, the device processing section 5 does not execute controls associated with the push of the slide key 1 even when the decision switch 8 detects the push of the slide key 1.

Subsequently, the normalizing section 43 converts the slid distance of the slide key 1 into a normalized value (Step S510'). The strength converting section 42 then determines the strength of a control signal according to the normalized slid distance of the slide key 1 (Step S511').

When determining that the slide key 1 is located in the limiting area (Step S505'/LIMITING AREA), the area determining section 41 transmits a signal to disable the detected result of the decision switch 8 to the device processing section 5, and disables the detected result (Step S512'). Namely, in the case where the slide key is located in the limiting area, the device processing section 5 does not execute controls associated with the push of the slide key 1 even when the decision switch 8 detects the push of the slide key 1.

Subsequently, the normalizing section 43 outputs a normalized value on the assumption that the slid distance of the slide key 1 is min_max (Step S513'). The strength converting section 42 determines the strength of a control signal according to the normalized value on the assumption that the slid distance of the slide key 1 is min_max (Step S514').

When the slide key 1 is located in the effective area or the limiting area, the device processing section 5 outputs a control signal corresponding to the slid direction of the slide key 1 with the strength determined by the strength converting section 42 to execute processes of moving a controlled object on a screen, and the like (Step S515').

By the above processing, it becomes possible to separately utilize a function to designate an arbitrary direction and a function as a push button with the slide key 1.

As described above, in the pointing device according to the fifth embodiment, it becomes possible not only to obtain the same effects as those obtained in the fourth embodiment but also to prevent malfunctions of the slide key 1 as a push button.

[Sixth Embodiment]

In the following, an explanation will be given of an operation of a pointing device according to a sixth embodiment of the present invention.

Figure 18:
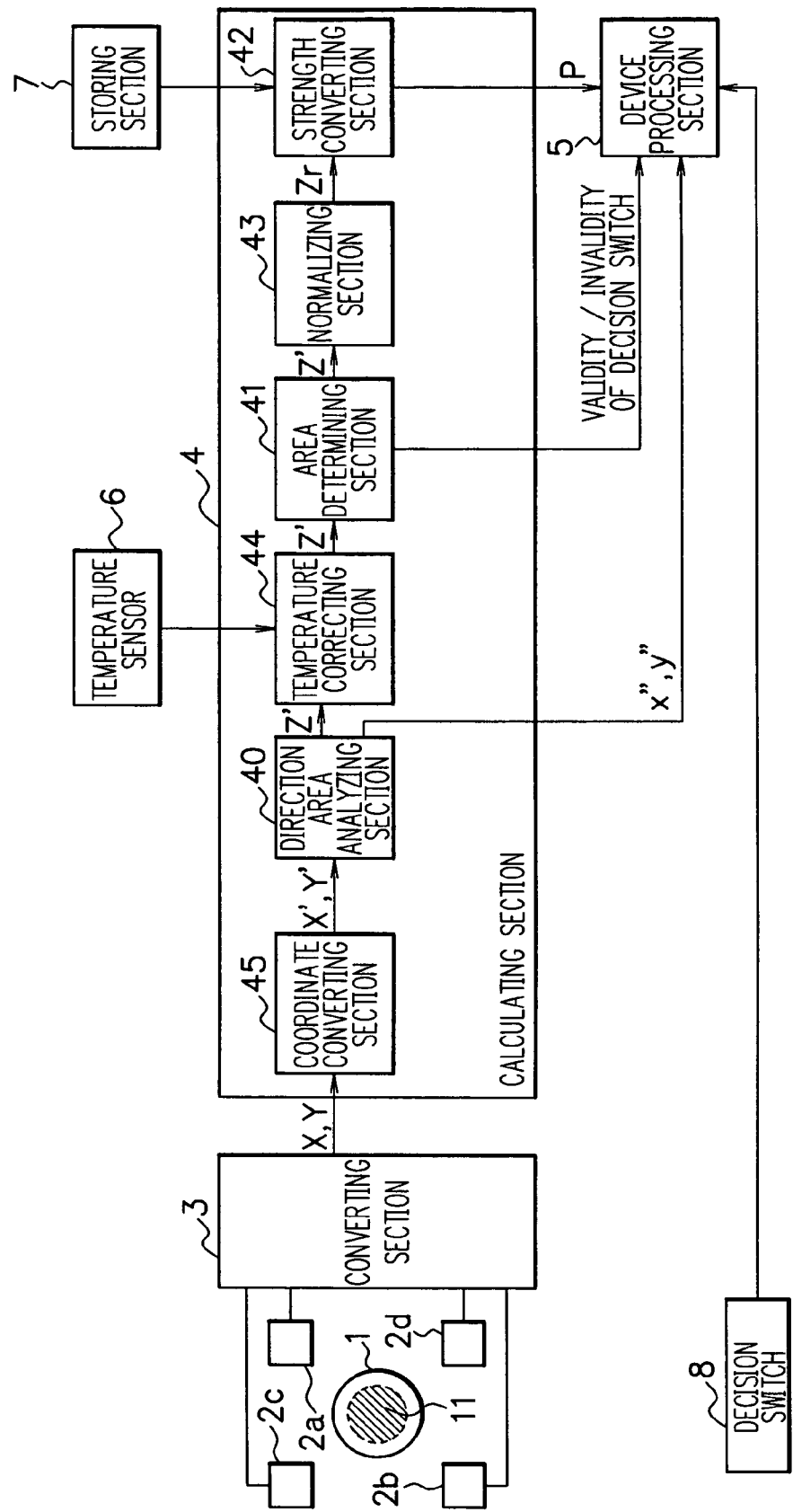
FIG. 18 is a diagram showing a configuration of a pointing device according to a sixth embodiment.

FIG. 18 shows a construction of a pointing device according to the sixth embodiment. The pointing device comprises a slide key 1, hall elements 2, a converting section 3, a calculating section 4, a device processing section 5, a temperature sensor 6, a storing section 7 and a decision switch 8.

In this embodiment, the hall elements 2 are placed such that the hall elements 2 are displaced at a predetermined angle to a vertical line and a horizontal line of a screen where a controlled object is displayed. Moreover, the calculating section 4 further includes a coordinate converting section 45. The configuration and the operation of the other sections are the same as those in the fifth embodiment.

Figure 19A:
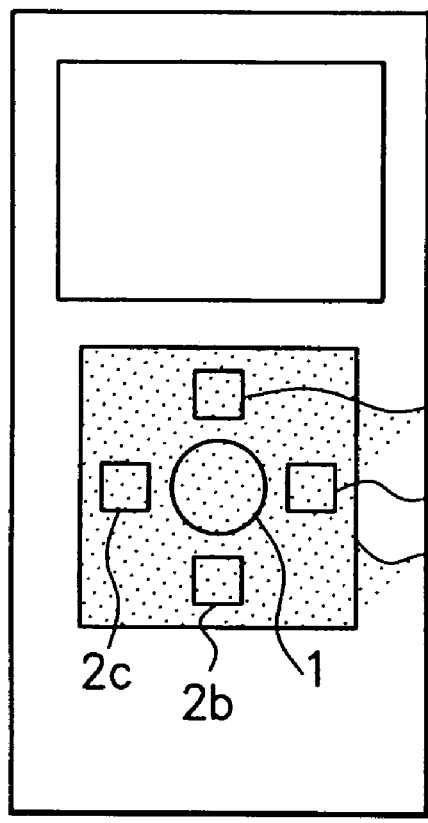
FIGS. 19A and 19B are diagrams showing an example of a relationship between a position of hall elements and a size of a substrate where the hall elements are mounted.

In the first to fifth embodiments, the hall elements 2 are placed on a vertical line and a horizontal line of the screen of a displaying device where a controlled object is displayed as shown in FIG. 19A. In this case, however, the substrate (printed circuit board) where the hall elements 2 are mounted may become large in area, which is an obstacle to miniaturization of an electronic apparatus where the pointing device is mounted.

Figure 19B:
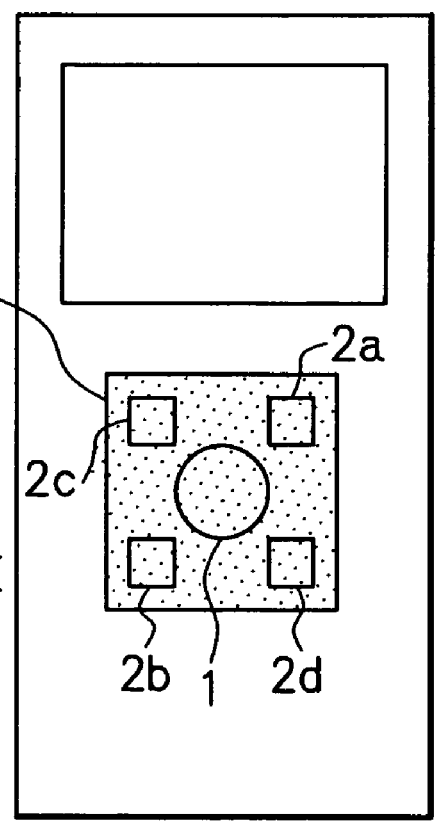

To reduce the area of the printed circuit board where the hall elements 2 are mounted, the hall elements 2 are placed at a predetermined angle (for example, 45 degrees) to the vertical line and the horizontal line of the screen where a controlled object is displayed as shown in FIG. 19B.

In this case, the positional information of the slide key 1 calculated by the converting section 3 are expressed as a value on the basis of the coordinate axes composed of the lines (2a–2b line, 2c–2d line) where the hall elements 2 are placed as shown in FIG. 19B. Accordingly, it is impossible to convert the positional information into control information (a control signal) corresponding to the vertical line and horizontal line of the display.

In the pointing device according to the sixth embodiment, the coordinate converting section 45 converts the positional information of the slide key 1 into information corresponding to the vertical and horizontal lines of the display of a displaying device.

Figure 20:
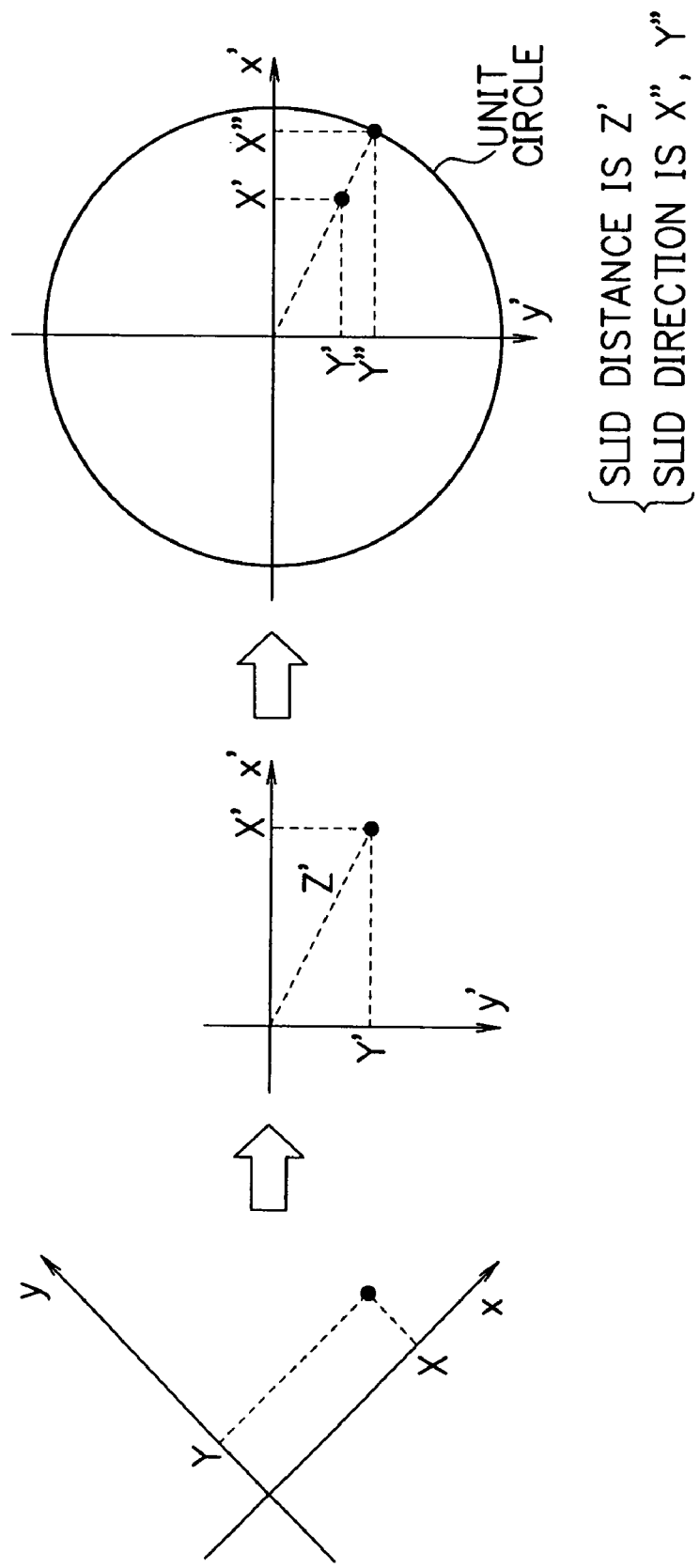
FIG. 20 is a diagram showing processes by a coordinate converting section.

FIG. 20 shows coordinate-axes converting processes executed by the coordinate converting section 45. First, the converting section 3 converts the detected result of magnetic flux density of the respective hall elements 2 into positional information (X, Y) on the basis of coordinate axes composed of the 2a–2b line (y direction) of the hall elements 2a and 2b and the 2c–2d line (x direction) of the hall elements 2c and 2d. Subsequently, when acquiring the positional information of the slide key 1 from the converting section 3, the coordinate converting section 45 converts the acquired information into positional information (X', Y') on the basis of coordinate axes composed of a vertical line (y' direction) and a horizontal line (x' direction) of the display, and outputs the positional information (X', Y') to the direction area analyzing section 40.

The strength converting section 42 requires information of the slid distance and the slid direction of the slide key 1 to determine the strength of a control signal. Accordingly, once the slid distance (Z') is calculated, the slid direction can be determined as long as the ratio of X' to Y' is gained. In this case, there is no need to retain the absolute value of the X' and Y'. Therefore, the direction area analyzing section 40 converts the X' and Y' into values X" and Y" on a unit circle.

When the direction area analyzing section 40 outputs the Z' thus calculate to the temperature correcting section 44, the pointing device executes the same process as those in the fifth embodiment.

Incidentally, while the conversion of the positional information from the x-y coordinate system into the x'-y' coordinate system may be operated in each case, it is more preferable to store coordinate values obtained before and after the conversion as a table in a memory (not shown) to convert the coordinate systems in reference to the table. In this case, the processes of the operation can be skipped.

Figure 21:
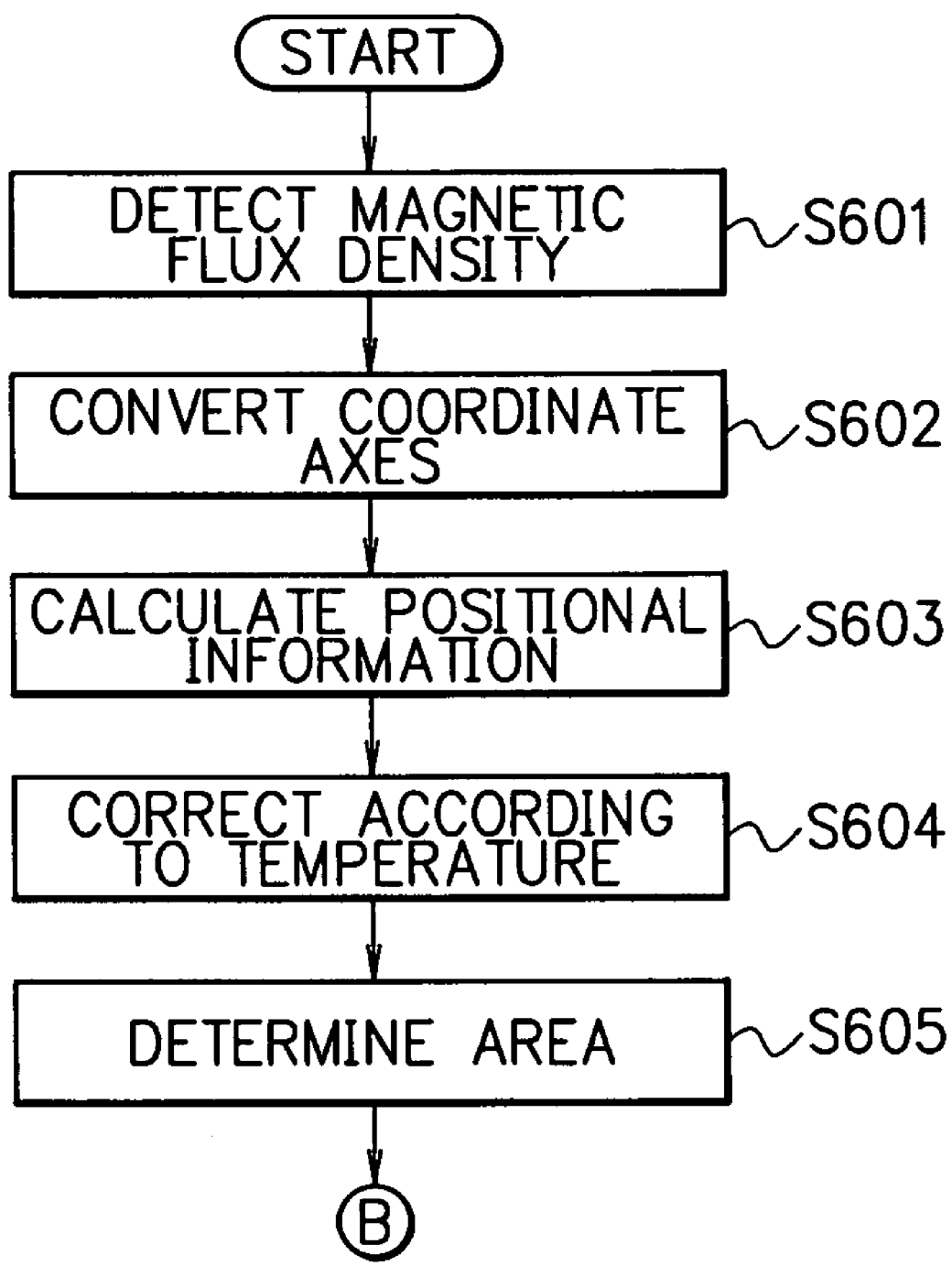
FIG. 21 is a flowchart for explaining the processes when changing a display position of a controlled object on a display screen using the pointing device of the sixth embodiment.
Figure 22:
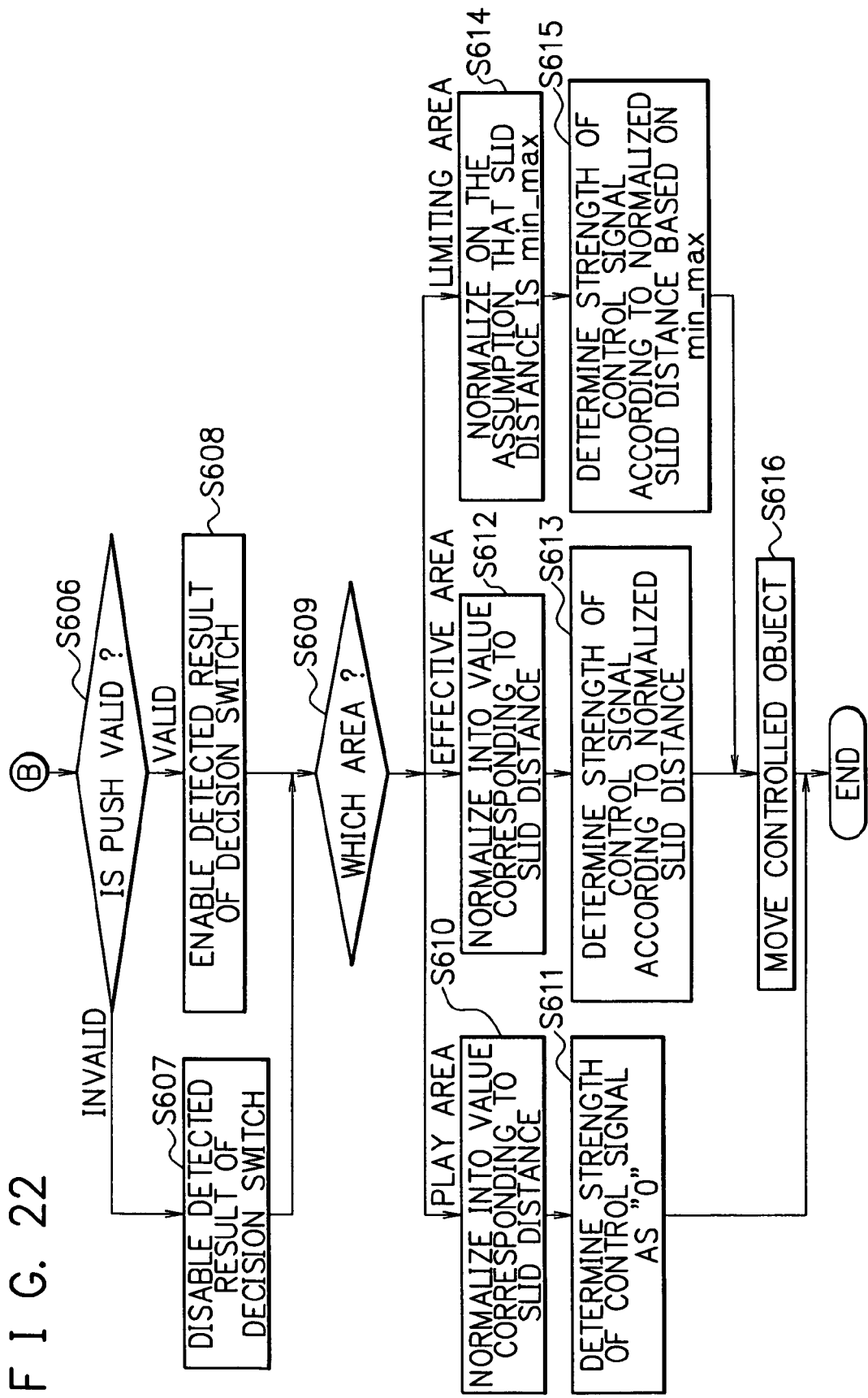
FIG. 22 is a flowchart for explaining the processes when changing a display position of a controlled object on a display screen using the pointing device of the sixth embodiment.
Figure 23:
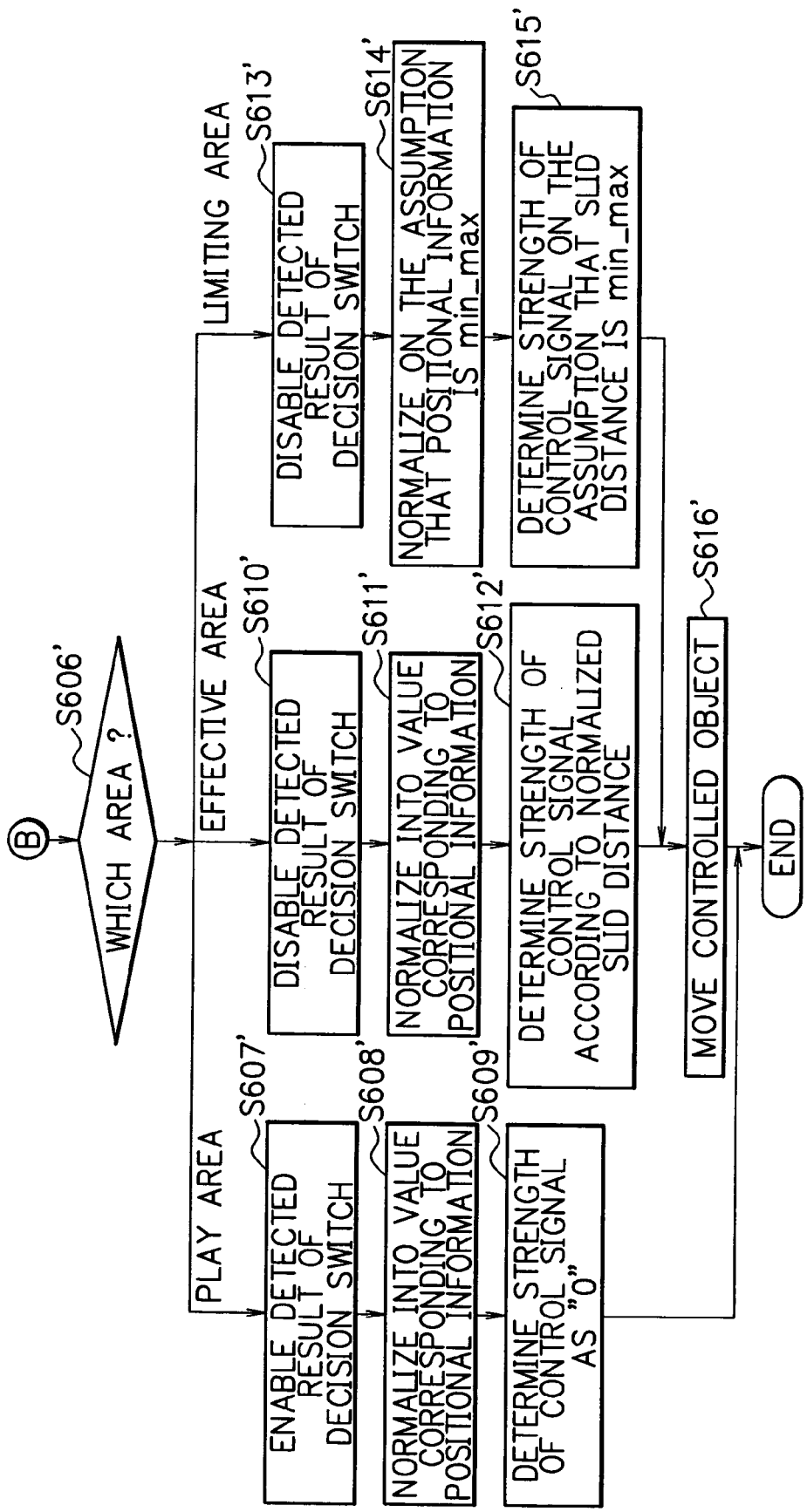
FIG. 23 is a flowchart for explaining the processes when changing a display position of a controlled object on a display screen using the pointing device of the sixth embodiment.

FIGS. 21, 22 and 23 show a flow of operation when the pointing device of the sixth embodiment generates a control signal for a controlled object. This operation is the same as that of the fifth embodiment except that the positional information of the magnet 11 is converted into positional information in a coordinate system corresponding to the vertical direction and the horizontal direction of the display screen at Step S602.

By this means, in the pointing device according to the sixth embodiment, it becomes possible not only to obtaining the same effects as those obtained in the fifth embodiment but also to generate a control signal even when a slid direction and a slid distance of the slide key 1 are not expressed in a certain coordinate system (for example, a coordinate system where the slid direction and the slid distance are expressed in coordinate axes corresponding to a vertical direction and a horizontal direction of a display screen).

[Seventh Embodiment]

Figure 24:
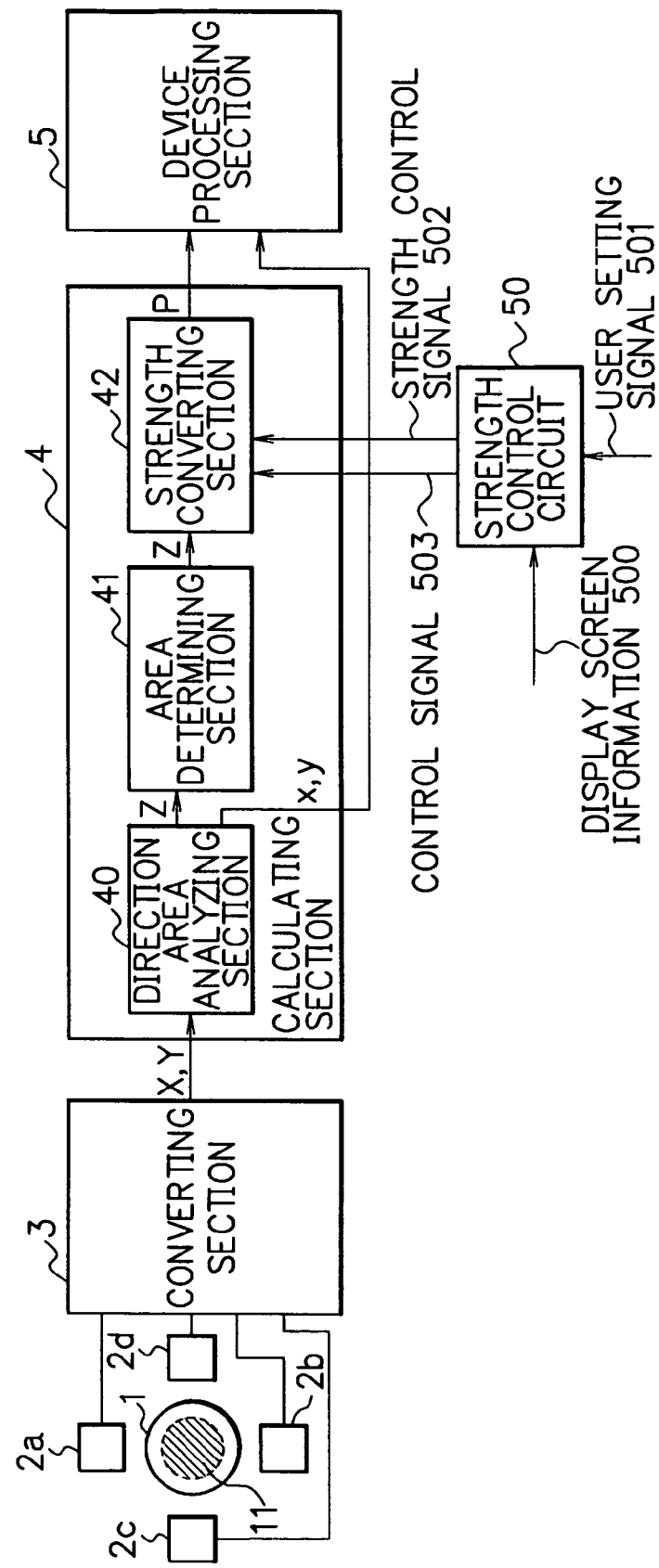
FIG. 24 is a diagram showing a configuration of a pointing device according to a seventh embodiment of the present invention.

In the following, an explanation will be given of an operation of a pointing device according to a seventh embodiment of the present invention. FIG. 24 is a block diagram showing a pointing device according to the seventh embodiment. The pointing device further includes a strength control circuit 50 for adjusting the strength of a control signal, the strength being determined at the strength converting section 42, in addition to the same configuration as that of the pointing device of the first embodiment. The strength control circuit 50 changes the strength of a control signal so as to change, according to the display screen, a velocity of moving a controlled object (for example, a pointer such as a cursor) on a screen in the direction of "X, Y".

Namely, the strength control circuit 50 generates a strength control signal 502 on the basis of a display screen information 500, and a control signal 503 on the basis of a user setting signal 501. The strength converting section 42 changes the strength of a control signal to be output to the device processing device 5 on the basis of the strength control signal 502 and the control signal 503. Subsequently, the device processing section 5 moves the pointer on the display screen on a displaying section (not shown) on the basis of the received control signal.

Hereat, the display screen information 500 is information indicating a kind of a display screen, for example, whether a moving range of the pointer is large or small on a display screen.

When the display screen information 500 indicates that the pointer has a large moving range on the display screen, the strength control circuit 50 generates a strength control signal 502 for accelerating a moving velocity of the pointer than usual. On the other hand, when the display screen information 500 indicates that the pointer has a small moving range on the display screen, the strength control circuit 50 generates a strength control signal 502 for slowing a moving velocity of the pointer than usual. By accelerating and slowing a moving velocity of the pointer according to the display screen information 500 indicating a moving range of the pointer, it becomes possible to improve the operationality of the pointing device.

Moreover, the display screen information 500 may be information indicating whether the size of a controlled object to be selected by the pointer is large or small on the display screen.

When the display screen information 500 indicates that the controlled object to be selected by the pointer is large on the display screen, the strength control circuit 50 generates a strength control signal 502 for accelerating a moving velocity of the pointer (or for keeping a moving velocity as usual). On the other hand, when the display screen information 500 indicates that the controlled object to be selected by the pointer is small on the display screen, the strength control circuit 50 generates a strength control signal 502 for slowing a moving velocity of the pointer than usual. By accelerating and slowing a moving velocity of the pointer according to the display screen information 500 indicating a size of a controlled object to be selected by the pointer, it becomes possible to improve the operationality of the pointing device.

Otherwise, when the pointing device of the seventh embodiment is applied to a mobile phone, the display screen information 500 may be information indicating, for example, one of the four types of the screen: a usual screen at the time of communication, stand-by state, and the like; a main menu screen for selecting a menu from plural menus; a screen for inputting symbols (characters, figures, pictorial symbols, etc.); and a screen indicating some kind of application is in execution.

In this case, the strength control circuit 50 generates a different strength control signal 502 according to the display screen information 500 to change a moving velocity of the pointer on the screen according to the display screen information 500. By this means, it becomes possible to improve the operationality of the pointing device.

The user setting signal 501 is generated on the basis of user settings (which the user sets by operating buttons (not shown) and the pointing device) with respect to each display screen when in a mode for setting a moving velocity of the pointer (pointer velocity setting mode).

Namely, when in the pointer velocity setting mode, the strength control circuit 50 generates a control signal 503 for changing a rule of operation (a function showing strength of a control signal to a slid distance of the slide key 1 as shown in FIGS. 4A to 4E), which is used when the strength converting section 42 determines the strength of a control signal, on the basis of the user setting signal 501 with respect to each display screen information 500.

To be concrete, the user setting signal 501 is initial-velocity setting information, low-velocity setting information, and high-velocity setting information for adjusting "initial velocity (velocity when starting a motion)", "low velocity (acceleration from the initial velocity)", and "high velocity (acceleration from the low velocity)" of the pointer on a display screen with plural levels (for example, twelve levels), respectively. To cite an instance, when the velocity of the pointer is adjustable with twelve levels, a user can set the initial velocity of the pointer on a display screen to "2", the low velocity to "4", and the high velocity to "8" by operating buttons (not shown) and the slide key 1 when in the pointer velocity setting mode.

Incidentally, it is preferable at the time of adjusting respective velocities to reduce the adjustable range when the absolute value of a velocity is small, and to increase the adjustable range when the absolute value of a velocity is large.

As described above, the strength control circuit 50 generates a control signal 503 for converting a rule of operation used by the strength converting section 42 on the basis of the user setting signal 501 (the above-described initial-velocity setting information, low-velocity setting information, and high-velocity setting information). Accordingly, the strength converting section 42 can change a rule of converting operation at respective timings in phase. Namely, by transmitting the control signal 503 from the strength control circuit 50 to the strength converting section 42, it becomes possible to change a conversion rule, which is used when the strength converting section 42 determines the strength of a control signal according to a slid distance of the slid key 1, according to the user setting signals 501. By this means, it becomes possible to accelerate or slow a moving velocity of the pointer according to the user settings, thereby achieving the improved operationality of the pointing device.

While an explanation is given of a case where the pointing device of the seventh embodiment further includes the strength control circuit 50 in addition to the configuration of the first embodiment, the pointing device of the other embodiments may include the strength control circuit 50 to change the strength of a control signal according to a display screen. Moreover, the strength control circuit 50 may be included in the calculating section 4.

Figure 25:
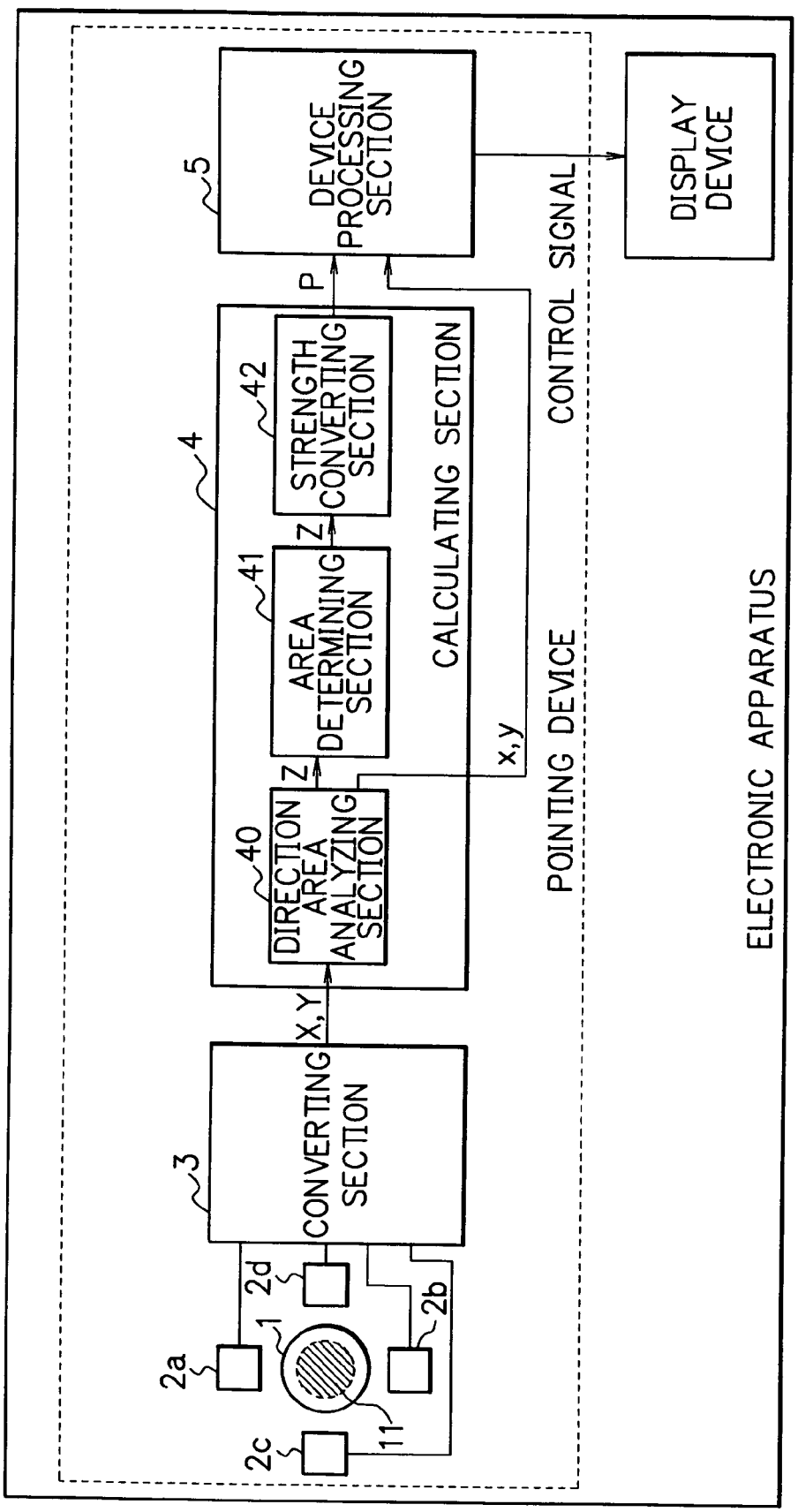
FIG. 25 is a diagram showing an example of a configuration of an electronic apparatus provided with a pointing device and a displaying device.

While in the respective embodiments described hereinbefore a display position of a controlled object displayed on a display screen of a displaying device (not shown) is moved with the pointing device, the pointing device and a display device may be combined as shown in FIG. 25. Namely, an electronic apparatus provided with the pointing device of the present invention can change a display section of a controlled object on a display screen by the same operations as those described in the respective embodiments.

Incidentally, while in the above-described embodiments a slid direction and a slid distance are detected with a magnet and hall elements, it is possible to use the other means. To cite an instance, a slide key may be provided with an optically readable mark to be read by CCD, etc. to detect a slid direction and a slid distance of the slide key.

Moreover, while in the above-described embodiments an explanation is given of a case where four hall elements are used to detect a slid direction and a slid distance of a slide key, the number of the hall elements are not limited to four as long as the position of the slide key can be identified.

Further, the rules of operations for transforming a slid distance of a slide key into a strength of a control signal are not limited to those shown in the above embodiments. Namely, any rule can be employed as long as a slid distance can be uniquely transformed into a strength of a control signal.

In addition, the control signal generated by the pointing device is not necessarily a signal for changing a display position of a controlled object displayed on a screen.

In this manner, the present invention can be diversely changed and modified.

As set forth hereinbefore, according to the present invention, there is provided a pointing device capable of generating a fixed signal regardless of operated directions and preventing malfunctions of generating a control signal when an operating section (slide key) is not slid even when an initial point of the operating section is not located at the center of an opening section.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A pointing device for detecting a slid distance and a slid direction of an operation key located approximately at the center of an opening section to generate a control signal according to the detected slid distance and the slid direction, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates the control signal corresponding to the slid distance of the operation key by:

determining a strength of the control signal as zero in the case where the operation key is located within a circular area whose center is located at the original point and whose radius is n/N of the max_max (n and N are arbitrary positive integers, and n<N);

determining a strength of the control signal corresponding to the slid distance of the operation key on the basis of a predetermined rule of operation in the case where the operation key is located within a toric area whose distance from the original point is larger than n/N of the max_max and smaller than the min_max; or determining a strength of the control signal corresponding to a strength obtained when a slid distance of the operation key is the min_max in the case where the operation key is located within an area whose distance from the original point is larger than the min_max.

2. A pointing device as claimed in claim 1, comprising a plurality of rules of operations for transforming the slid distance of the operation key into the strength of the control signal.

3. A pointing device as claimed in claim 2, wherein:

the toric area is divided into a plurality of subareas by setting at least one circular arc as a boundary whose center is the original point; and the respective subareas have different variations of the strength of the control signal to the slid distance of the operation key.

4. A pointing device as claimed in claim 3, further comprising:

a section for measuring a temperature of an environment where the pointing device is used; and a section for correcting the detected slid distance of the operation key according to the temperature.

5. A pointing device as claimed in claim 3, further comprising:

a push switch for detecting a push of the operation key, wherein:

the pointing device disables the push of the operation key detected by the push switch when the operation key is located outside a circular area whose center is the original point and whose radius is m/N of the max_max (m is an arbitrary positive integer, and m<N).

6. A pointing device as claimed in claim 3, wherein:

the operation key is provided with a plurality of hall elements in the vicinity of the opening section; and the pointing device detects the slid direction and the slid distance of the operation key on the basis of magnetic flux density detected by the respective hall elements.

7. A pointing device as claimed in claim 3, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

8. A pointing device as claimed in claim 2, further comprising:
a section for measuring a temperature of an environment where the pointing device is used; and
a section for correcting the detected slid distance of the operation key according to the temperature.

9. A pointing device as claimed in claim 2, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

10. A pointing device as claimed in claim 2, wherein:
the operation key is provided with a plurality of hall elements in the vicinity of the opening section; and
the pointing device detects the slid direction and the slid distance of the operation key on the basis of magnetic flux density detected by the respective hall elements.

11. A pointing device as claimed in claim 2, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

12. A pointing device as claimed in claim 1, wherein:
the toric area is divided into a plurality of subareas by setting at least one circular arc as a boundary whose center is the original point; and
the respective subareas have different variations of the strength of the control signal to the slid distance of the operation key.

13. A pointing device as claimed in claim 12, further comprising:
a section for measuring a temperature of an environment where the pointing device is used; and
a section for correcting the detected slid distance of the operation key according to the temperature.

14. A pointing device as claimed in claim 12, wherein:
the operation key is provided with a plurality of hall elements in the vicinity of the opening section; and
the pointing device detects the slid direction and the slid distance of the operation key on the basis of magnetic flux density detected by the respective hall elements.

15. A pointing device as claimed in claim 12, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

16. A pointing device as claimed in claim 1, further comprising:
a section for measuring a temperature of an environment where the pointing device is used; and
a section for correcting the detected slid distance of the operation key according to the temperature.

17. A pointing device as claimed in claim 1, wherein:
the operation key is provided with a plurality of hall elements in the vicinity of the opening section; and
the pointing device detects the slid direction and the slid distance of the operation key on the basis of magnetic flux density detected by the respective hall elements.

18. A pointing device as claimed in claim 1, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

19. A pointing device as claimed in claim 1, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

20. A pointing device for detecting a slid distance and a slid direction of an operation key located approximately at the center of an opening section, generating signal strength information on the basis of the slid distance of the operation key, and generating a control signal corresponding to the signal strength information and the slid direction of the operation key, wherein:
when an original point is defined as a point where a slid distance of the operation key is zero, and a maximum value and a minimum value are defined as max_max and min_max, respectively, in the state where the operation key is moved until reaching the rim of the opening section, the pointing device generates:
signal strength information for determining a strength of the control signal as zero in the case where the operation key is located within a circular area whose center is located at the original point and whose radius is n/N of the max_max (n and N are arbitrary positive integers, and n<N);
signal strength information on the basis of a predetermined rule of operation so that a strength of the control signal corresponds to the slid distance of the operation key in the case where the operation key is located within a toric area whose distance from the original point is larger than n/N of the max_max and smaller than the min_max; or
signal strength information for determining a strength of the control signal so as to be identical to the strength when a slid distance of the operation key is the min_max in the case where the operation key is located within an area whose distance from the original point is larger than the min_max; and
a strength of the control signal is fixed regardless of a slid direction of the operation key when the operation key is located at the position where a distance from the original point is the min_max.

21. A pointing device as claimed in claim 20, further comprising:
a section for measuring a temperature of an environment where the pointing device is used; and
a section for correcting the detected slid distance of the operation key according to the temperature.

22. A pointing device as claimed in claim 12, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

23. A pointing device as claimed in claim 20, wherein:
the toric area is divided into a plurality of subareas by setting at least one circular arc as a boundary whose center is the original point; and
the respective subareas have different variations of the signal strength information to the slid distance of the operation key.

24. A pointing device as claimed in claim 23, further comprising:
a section for measuring a temperature of an environment where the pointing device is used; and
a section for correcting the detected slid distance of the operation key according to the temperature.

25. A pointing device as claimed in claim 23, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

26. A pointing device as claimed in claim 23, wherein:
the operation key is provided with a plurality of hall elements in the vicinity of the opening section; and
the pointing device detects the slid direction and the slid distance of the operation key on the basis of magnetic flux density detected by the respective hall elements.

27. A pointing device as claimed in claim 23, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

28. A pointing device as claimed in claim 20, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

29. A pointing device as claimed in claim 20, wherein:
the operation key is provided with a plurality of hall elements in the vicinity of the opening section; and
the pointing device detects the slid direction and the slid distance of the operation key on the basis of magnetic flux density detected by the respective hall elements.

30. A pointing device as claimed in claim 20, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

31. A pointing device as claimed in claim 20, comprising a plurality of rules of operations for transforming the slid distance of the operation key into the signal strength information.

32. A pointing device as claimed in claim 31, wherein:
the toric area is divided into a plurality of subareas by setting at least one circular arc as a boundary whose center is the original point; and
the respective subareas have different variations of the signal strength information to the slid distance of the operation key.

33. A pointing device as claimed in claim 32, further comprising:
a section for measuring a temperature of an environment where the pointing device is used; and
a section for correcting the detected slid distance of the operation key according to the temperature.

34. A pointing device as claimed in claim 31, further comprising:
a section for measuring a temperature of an environment where the pointing device is used; and
a section for correcting the detected slid distance of the operation key according to the temperature.

35. A pointing device as claimed in claim 31, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

36. A pointing device as claimed in claim 31, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

37. A pointing device as claimed in claim 31, wherein:
the operation key is provided with a plurality of hall elements in the vicinity of the opening section; and
the pointing device detects the slid direction and the slid distance of the operation key on the basis of magnetic flux density detected by the respective hall elements.

38. A pointing device as claimed in claim 32, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

39. A pointing device as claimed in claim 32, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

40. A pointing device as claimed in claim 32, wherein:
the operation key is provided with a plurality of hall elements in the vicinity of the opening section; and
the pointing device detects the slid direction and the slid distance of the operation key on the basis of magnetic flux density detected by the respective hall elements.

41. An electronic apparatus comprising a pointing device for detecting a slid distance and a slid direction of an operation key located approximately at the center of an opening section to generate a control signal according to the detected slid distance and the slid direction, and a display section for displaying information, wherein:
when an original point is defined as a point where a slid distance of the operation key is zero, and a maximum value and a minimum value are defined as max_max and min_max, respectively, in the state where the operation key is moved until reaching the rim of the opening section, the pointing device generates the control signal corresponding to the slid distance of the operation key by:
determining a strength of the control signal as zero in the case where the operation key is located within a circular area whose center is located at the original point and whose radius is n/N of the max_max (n and N are arbitrary positive integers, and n<N);
determining a strength of the control signal corresponding to the slid distance of the operation key on the basis of a predetermined rule of operation in the case where the operation key is located within a toric area whose distance from the original point is larger than n/N of the max_max and smaller than the min_max; or
determining a strength of the control signal corresponding to a strength obtained when a slid distance of the operation key is the min_max in the case where the operation key is located within an area whose distance from the original point is larger than the min_max; and
a display position of a controlled object displayed on the display section is changed on the basis of the control signal.

42. An electronic apparatus as claimed in claim 41, comprising a plurality of rules of operations for transforming the slid distance of the operation key into the strength of the control signal.

43. An electronic apparatus as claimed in claim 42, wherein:
the toric area is divided into a plurality of subareas by setting at least one circular arc as a boundary whose center is the original point; and
the respective subareas have different variations of the strength of the control signal to the slid distance of the operation key.

44. An electronic apparatus as claimed in claim 43, further comprising:
a section for measuring a temperature of an environment where the pointing device is used; and
a section for correcting the detected slid distance of the operation key according to the temperature.

45. An electronic apparatus as claimed in claim 43, wherein:
the operation key is provided with a plurality of hall elements in the vicinity of the opening section; and
the pointing device detects the slid direction and the slid distance of the operation key on the basis of magnetic flux density detected by the respective hall elements.

46. An electronic apparatus as claimed in claim 43, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

47. An electronic apparatus as claimed in claim 43, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

48. An electronic apparatus as claimed in claim 42, further comprising:
a section for measuring a temperature of an environment where the pointing device is used; and
a section for correcting the detected slid distance of the operation key according to the temperature.

49. An electronic apparatus as claimed in claim 42, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

50. An electronic apparatus as claimed in claim 42, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

51. An electronic apparatus as claimed in claim 42, wherein:
the operation key is provided with a plurality of hall elements in the vicinity of the opening section; and
the pointing device detects the slid direction and the slid distance of the operation key on the basis of magnetic flux density detected by the respective hall elements.

52. An electronic apparatus as claimed in claim 41, further comprising:
a section for measuring a temperature of an environment where the pointing device is used; and
a section for correcting the detected slid distance of the operation key according to the temperature.

53. An electronic apparatus as claimed in claim 41, wherein:

when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

54. An electronic apparatus as claimed in claim 41, further comprising:

a push switch for detecting a push of the operation key, wherein:

the pointing device disables the push of the operation key detected by the push switch when the operation key is located outside a circular area whose center is the original point and whose radius is m/N of the max_max (m is an arbitrary positive integer, and m<N).

55. An electronic apparatus as claimed in claim 41, wherein:

the operation key is provided with a plurality of hall elements in the vicinity of the opening section; and the pointing device detects the slid direction and the slid distance of the operation key on the basis of magnetic flux density detected by the respective hall elements.

56. An electronic apparatus as claimed in claim 41, wherein:

the toric area is divided into a plurality of subareas by setting at least one circular arc as a boundary whose center is the original point; and the respective subareas have different variations of the strength of the control signal to the slid distance of the operation key.

57. An electronic apparatus as claimed in claim 56, further comprising:

a section for measuring a temperature of an environment where the pointing device is used; and a section for correcting the detected slid distance of the operation key according to the temperature.

58. An electronic apparatus as claimed in claim 56, wherein:

when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

59. An electronic apparatus as claimed in claim 56, further comprising:

a push switch for detecting a push of the operation key, wherein:

the pointing device disables the push of the operation key detected by the push switch when the operation key is located outside a circular area whose center is the original point and whose radius is m/N of the max_max (m is an arbitrary positive integer, and m<N).

60. An electronic apparatus as claimed in claim 56, wherein:

the operation key is provided with a plurality of hall elements in the vicinity of the opening section; and the pointing device detects the slid direction and the slid distance of the operation key on the basis of magnetic flux density detected by the respective hall elements.

61. An electronic apparatus comprising a pointing device for detecting a slid distance and a slid direction of an operation key located approximately at the center of an opening section, generating signal strength information on the basis of the slid distance of the operation key, and generating a control signal corresponding to the signal strength information and the slid direction of the operation key, and a display section for displaying information, wherein:

when an original point is defined as a point where a slid distance of the operation key is zero, and a maximum value and a minimum value are defined as max_max and min_max, respectively, in the state where the operation key is moved until reaching the rim of the opening section, the pointing device generates:

signal strength information for determining a strength of the control signal as zero in the case where the operation key is located within a circular area whose center is located at the original point and whose radius is n/N of the max_max (n and N are arbitrary positive integers, and n<N);

signal strength information on the basis of a predetermined rule of operation so that a strength of the control signal corresponds to the slid distance of the operation key in the case where the operation key is located within a toric area whose distance from the original point is larger than n/N of the max_max and smaller than the min_max; or signal strength information for determining a strength of the control signal so as to be identical to the strength when a slid distance of the operation key is the min_max in the case where the operation key is located within an area whose distance from the original point is larger than the min_max; and a strength of the control signal is fixed regardless of a slid direction of the operation key when the operation key is located at the position where a distance from the original point is the min_max; and a display position of a controlled object displayed on the display section is changed on the basis of the control signal.

62. An electronic apparatus as claimed in claim 61, comprising a plurality of rules of operations for transforming the slid distance of the operation key into the signal strength information.

63. An electronic apparatus as claimed in claim 62, wherein:

the toric area is divided into a plurality of subareas by setting at least one circular arc as a boundary whose center is the original point; and the respective subareas have different variations of the signal strength information to the slid distance of the operation key.

64. An electronic apparatus as claimed in claim 63, further comprising:

a section for measuring a temperature of an environment where the pointing device is used; and a section for correcting the detected slid distance of the operation key according to the temperature.

65. An electronic apparatus as claimed in claim 63, wherein:

the operation key is provided with a plurality of hall elements in the vicinity of the opening section; and the pointing device detects the slid direction and the slid distance of the operation key on the basis of magnetic flux density detected by the respective hall elements.

66. An electronic apparatus as claimed in claim 63, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

67. An electronic apparatus as claimed in claim 63, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

68. An electronic apparatus as claimed in claim 62, wherein:
the operation key is provided with a plurality of hall elements in the vicinity of the opening section; and
the pointing device detects the slid direction and the slid distance of the operation key on the basis of magnetic flux density detected by the respective hall elements.

69. An electronic apparatus as claimed in claim 62, further comprising:
a section for measuring a temperature of an environment where the pointing device is used; and
a section for correcting the detected slid distance of the operation key according to the temperature.

70. An electronic apparatus as claimed in claim 62, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

71. An electronic apparatus as claimed in claim 62, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

72. An electronic apparatus as claimed in claim 61, further comprising:
a section for measuring a temperature of an environment where the pointing device is used; and
a section for correcting the detected slid distance of the operation key according to the temperature.

73. An electronic apparatus as claimed in claim 61, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

74. An electronic apparatus as claimed in claim 61, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

75. An electronic apparatus as claimed in claim 61, wherein:
the operation key is provided with a plurality of hall elements in the vicinity of the opening section; and
the pointing device detects the slid direction and the slid distance of the operation key on the basis of magnetic flux density detected by the respective hall elements.

76. An electronic apparatus as claimed in claim 61, wherein:
the toric area is divided into a plurality of subareas by setting at least one circular arc as a boundary whose center is the original point; and
the respective subareas have different variations of the signal strength information to the slid distance of the operation key.

77. An electronic apparatus as claimed in claim 76, wherein:
the operation key is provided with a plurality of hall elements in the vicinity of the opening section; and
the pointing device detects the slid direction and the slid distance of the operation key on the basis of magnetic flux density detected by the respective hall elements.

78. An electronic apparatus as claimed in claim 76, further comprising:
a section for measuring a temperature of an environment where the pointing device is used; and
a section for correcting the detected slid distance of the operation key according to the temperature.

79. An electronic apparatus as claimed in claim 76, wherein:
when the slid distance and the slid direction of the operation key is expressed in a coordinate system different from a coordinate system used for a control signal, the pointing device converts the slid distance and the slid direction of the operation key into a slid distance and a slid direction expressed in the same coordinate system as used for the control signal.

80. An electronic apparatus as claimed in claim 76, further comprising:
a push switch for detecting a push of the operation key, wherein:
the pointing device disables the push of the operation key detected by the push switch when the operation key is located outside a circular area whose center is the original point and whose radius is m/N of the max_max (m is an arbitrary positive integer, and m<N).

* * * * *